US012785772B2

(12) United States Patent
Mu

(10) Patent No.: US 12,785,772 B2
(45) Date of Patent: Nov. 3, 2026

(54) INFORMATION REPORTING METHOD, INFORMATION REPORTING DEVICE AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 316 days.

(21) Appl. No.: 18/276,301

(22) PCT Filed: Feb. 8, 2021

(86) PCT No.: PCT/CN2021/076113

§ 371 (c)(1),
(2) Date: Aug. 8, 2023

(87) PCT Pub. No.: WO2022/165856

PCT Pub. Date: Aug. 11, 2022

(65) Prior Publication Data

US 2024/0129955 A1 Apr. 18, 2024

(51) Int. Cl.

| | |
|---|---|
| ***H04B 7/06*** | (2006.01) |
| ***H04W 8/22*** | (2009.01) |
| ***H04W 74/08*** | (2009.01) |
| ***H04W 74/0833*** | (2024.01) |

(52) U.S. Cl.

CPC ............ *H04B 7/0626* (2013.01); *H04W 8/22* (2013.01); *H04W 74/0833* (2013.01); *H04W 74/0866* (2013.01)

(58) Field of Classification Search

CPC .. H04B 7/0626; H04W 8/22; H04W 74/0833; H04W 74/0866; H04W 74/004; H04W 74/002

See application file for complete search history.

(56) References Cited

U.S. PATENT DOCUMENTS

| | | | | |
|---|---|---|---|---|
| 2013/0294363 | A1* | 11/2013 | Feng | H04W 74/002 370/328 |
| 2018/0007709 | A1* | 1/2018 | Seo | H04W 72/20 |
| 2019/0082451 | A1* | 3/2019 | Yun | H04W 72/1268 |
| 2020/0028629 | A1* | 1/2020 | Xue | H04L 1/1864 |
| 2021/0378018 | A1* | 12/2021 | Jang | H04W 74/0833 |

(Continued)

OTHER PUBLICATIONS

PCT/CN2021/076113, International Search Report dated Aug. 30, 2021, 2 pages.

(Continued)

*Primary Examiner* — Christine Ng
(74) *Attorney, Agent, or Firm* — Cozen O'Connor

(57) ABSTRACT

In a method for sending information, a terminal determines a first random access message from a plurality of random access messages supported by the terminal and sends terminal information based on the first random access message. In a method for receiving information, a network device, determines a first random access message from a plurality of random access messages supported by the network device; and receives terminal information based on the first random access message. The terminal information includes at least one of terminal capability information or channel state information of the terminal.

16 Claims, 9 Drawing Sheets

(56) References Cited

U.S. PATENT DOCUMENTS

| | | | | |
|---|---|---|---|---|
| 2021/0385896 A1* | 12/2021 | Kim | .................... | H04W 36/305 |
| 2022/0182974 A1* | 6/2022 | Liu | ........................ | H04W 68/02 |
| 2022/0346174 A1* | 10/2022 | Wang | .................... | H04W 76/18 |
| 2023/0127485 A1* | 4/2023 | Sun | ........................ | H04L 5/0053<br>370/329 |
| 2023/0262724 A1* | 8/2023 | Liu | ........................ | H04L 1/0072<br>370/329 |
| 2023/0269778 A1* | 8/2023 | Dai | ..................... | H04W 74/006<br>370/329 |
| 2023/0319708 A1* | 10/2023 | Ma | .......................... | H04W 8/24<br>455/574 |
| 2024/0008091 A1* | 1/2024 | Mu | ...................... | H04B 17/328 |

OTHER PUBLICATIONS

Sierra Wireless S.A. “Methods for barring and for capability reporting”, 3GPP TSG-RAN WG2 Meeting #113 electronic R2-2100636; Jan. 2021; 7 pages.

European Patent Application No. 21923866.4 Search and Opinion Jan. 3, 2024, 10 pages.

Ericsson “UE identification and access restriction for RedCap” 3GPP TSG-RAN WG1 Meeting #103-e, R1-2007533, Oct.-Nov. 2020, 4 pages.

Sierra Wireless S.A. “Methods for barring and for capability reporting” 3GPP TSG-RAN WG2 Meeting #113 electronic, R2-2100636, Jan.-Feb. 2021, 7 pages.

* cited by examiner

INFORMATION REPORTING METHOD, INFORMATION REPORTING DEVICE AND STORAGE MEDIUM

CROSS-REFERENCE TO RELATED APPLICATION

This application is a national phase of International Application No. PCT/CN2021/076113, filed on Feb. 8, 2021, the content of which is hereby incorporated by reference in its entirety.

TECHNICAL FIELD

The disclosure relates to a field of wireless communication technology, in particular to a method for reporting information, an apparatus for reporting information and a storage medium.

BACKGROUND

In a wireless communication system, Machine Type Communication (MTC) technology and Narrow Band Internet of Things (NB-IoT) technology are proposed for low-rate and high-latency scenarios such as those typically used in Internet of Things (IoT) services. Due to the development and wide-spread adoption of the IoT services, the MTC technology and NB-IoT technology can no longer satisfy the rate and latency requirements of current IoT services. Therefore, a new kind of terminal, i.e., Reduced capability (Redcap) terminal, also referred to as NR-lite, is designed to provide the IoT service requirements.

SUMMARY

According to a first aspect of the embodiments of the disclosure, a method for sending information, performed by a terminal, is provided. The method includes:

determining a first random access message from a plurality of random access messages supported by the terminal; and sending terminal information based on the first random access message, in which the terminal information includes at least one of terminal capability information or channel state information of the terminal.

According to a second aspect of embodiments of the disclosure, a method for receiving information, performed by a network device, is provided. The method includes:

determining a first random access message from a plurality of random access messages supported by the network device; and receiving terminal information based on the first random access message, in which the terminal information includes at least one of terminal capability information or channel state information of a terminal.

According to a third aspect of embodiments of the disclosure, a device for reporting information is provided. The device includes:

a processor and a memory for storing instructions executable by the processor, in which the processor is configured to perform the method for reporting information of the first aspect or any implementation of the first aspect or the method for reporting information of the second aspect or any implementation of the second aspect.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
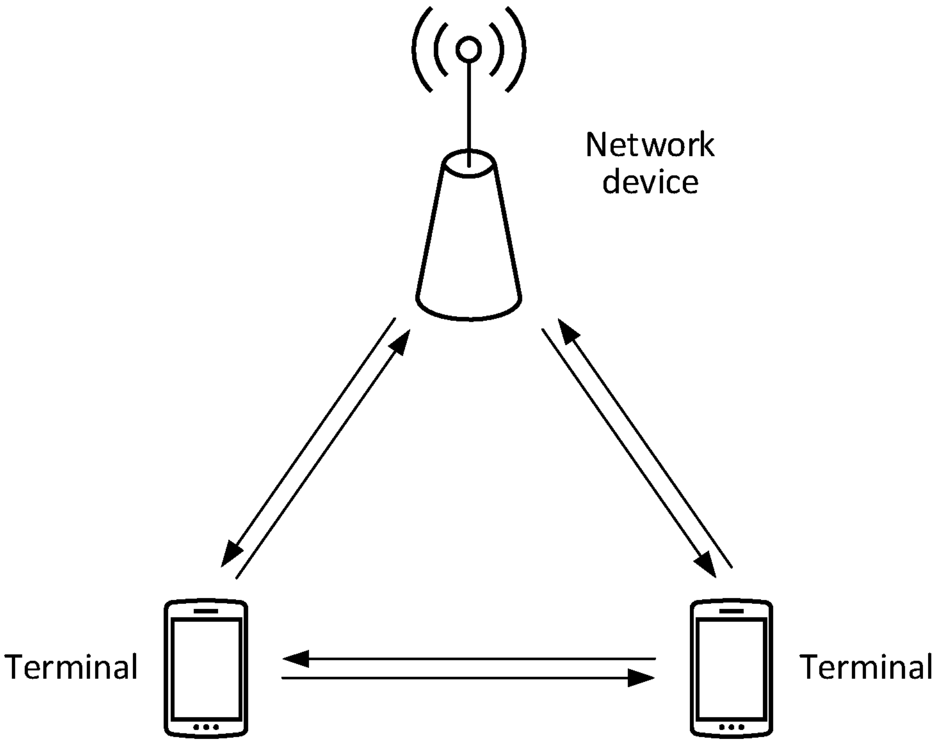
FIG. 1 is a schematic diagram illustrating a communication system between a network device and terminals according to an example embodiment.

FIG. 1 is a schematic diagram illustrating a communication system between a network device and terminals according to an example embodiment. The method according to the disclosure can be applied in the communication system illustrated in FIG. 1. As illustrated in FIG. 1, a network side device may send a signaling based on an architecture illustrated in FIG. 1.

It is understandable that the communication system between the network device and the terminals illustrated in FIG. 1 is only for schematic illustration, and other network devices may be included in the wireless communication system, such as core network devices, wireless relay devices and wireless backhaul devices, which are not illustrated in FIG. 1. The number of network devices and the number of terminals included in the wireless communication system are not limited in the embodiments of the disclosure.

It is further understandable that the wireless communication system according to the embodiments of the disclosure is a network that provides the wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access/collision avoidance. Depending on factors such as capacity, rate, and delay of different networks, the networks can be classified as a second Generation (2G) network, a 3G network, a 4G network, or a future evolved network, such as a 5G network, which can also be called a new radio (NR) network. For easy of description, in this disclosure, sometimes the wireless communication network is simply referred to as a network.

The "network device" involved in the disclosure may also be referred to as a radio access network device. The radio access network device may be: a base station, an evolved base station (evolved node B, i.e., eNB), a femtocell, an access point (AP) in a wireless fidelity (WIFI) system, a radio relay node, a radio backhaul node, a transmission point (TP) or a transmission and reception point (TRP), a gNB in an NR system, or components or a part of the devices that constitute the base station. The network device may also be a vehicle-mounted device in a vehicle to everything (V2X) communication system. It should be understandable that the specific technology and the specific device form used by the network device are not limited in the embodiments of the disclosure.

The "terminal" involved in the disclosure may also be referred to as a terminal device, a use equipment (UE), a mobile station (MS), or a mobile terminal (MT), which is a device that provides voice and/or data connectivity to a user. For example, the terminal can be a handheld device or a vehicle-mounted device with a wireless connectivity function. For example, the existing terminals include a mobile phone, a pocket personal computer (PPC), a handheld computer, a personal digital assistant (PDA), a laptop, a tablet computer, a wearable device, or a vehicle-mounted device, etc. In addition, the terminal device may also be a vehicle-mounted device in the V2X communication system. It is understandable that the specific technology and the specific device form used by the terminal are not limited in the embodiments of this disclosure.

The Machine Type Communication (MTC) technology and the Narrow Band Internet of Thing (NB-IoT) technology are proposed for a Reduced capability user equipment (Redcap UE) in communication systems, such as a Long Term Evolution (LTE) 4G system, to support IoT services. These two kind of technologies mainly focus on low-rate and high-latency scenarios, such as meter reading, environmental monitoring, and other scenarios. The maximum transmission rate currently supported by the NB-IoT technology is several hundred kbps (kilo bits per second), while the maximum transmission rate currently supported by the MTC technology is several Mbps (million bits per second). However, with the continuous development of IoT services, such as population of services such as video monitoring, smart home, wearable device and industrial sensing monitoring, these services usually require a transmission rate ranging from tens of Mbps to 100 Mbps, and the above services also have relatively high requirements for latency, and thus the MTC technology and the NB-IoT technology in the LTE can hardly satisfy the requirements of the above services. Based on this case, designing a new UE in the 5G NR is proposed to cover the requirements of such mid-end IoT devices. In the current 3rd Generation Partnership Project (3GPP) standardization, this new type of terminal is called Reduced Capability (Redcap) terminal (or called Redcap UE) or simply referred to as NR-lite. There may be many different types of Redcap UEs in the communication system, such as high-end Redcap terminal and low-end Redcap terminal, and different terminal types may have different terminal capabilities or coverage capabilities. For example, the high-end terminal has 2 Rx antennas and the low-end terminal has only 1 Rx antenna, and thus these two terminals have different coverage capabilities.

Since the Redcap terminal has a small number of antennas and a relatively low coverage capability, the Redcap terminal needs to report its terminal capability or terminal type to a network in advance. In the related art, the terminal may report the terminal capability information or the terminal type through a random access message. However, the network needs to divide resources into different Physical Random Access Channels (PRACHs) and bandwidth parts (BWPs) for the terminal, resulting in resource fragmentations. Moreover, the terminal still needs to report information based on the access message Msg.1 when a configured initial BWP is small or the coverage is good, resulting in a waste of resources.

Since the terminal capability(ties) of the Redcap terminal is(are) different from the terminal capability(ties) of a normal terminal, the Redcap terminal needs to report to the network at least one of: the terminal capability, the terminal type or the channel state. In the related art, the terminal can report the terminal capability in two ways. The first way for reporting the terminal capability is reporting based on a transmission of the Msg. 1 in a random access process. That is, the network device assigns specific Msg. 1 transmission resources for the accesses of different types of Redcap terminals. For example, different initial bandwidth parts (BWPs), different Physical Random Access Channel (PRACH) transmission times, different transmission frequencies, or different random access preambles are configured for different types of Redcap terminals. The Redcap terminal selects a specific resource for access based on the capability, the type or the channel state. The network device determines the type, the capability or the channel state of the terminal based on the received Msg. 1. The second way for reporting the terminal capability is reporting based on a transmission of Msg. 3 in a random access process. The Redcap terminal carries its capability information, terminal type or the channel state information in a data packet of the Msg. 3 and sends it to the network device. The network device determines the type, the capability or the channel state of the Redcap terminal based on the received Msg. 3.

However, in the related art, one of the above-mentioned ways for reporting the terminal capability is allowed. Moreover, reporting the terminal capability based on the Msg. 1, needs to rely on the division of the PRACH resources by the network, resulting in resource fragmentations. Moreover, reporting the terminal capability based on the Msg. 1 is generally necessary only in the case where the configured initial BWP is larger or the terminal (or called UE) has poor coverage, resulting in the waste of resources.

On the basis, the disclosure provides a method for reporting information. According to the method, the network device and the terminal support reporting the terminal information based on the Msg.1 and the Msg. 3, the network can perform a configuration based on the state of the network or the terminal can make a selection based on the terminal side information according to the preconfigured or predefined rule, which not only inform the network of the terminal capability in a timely manner, but also avoids the waste of resources.

Figure 2:
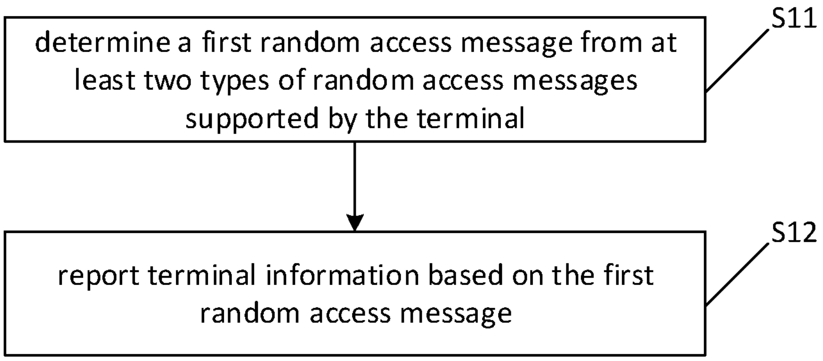
FIG. 2 is a flowchart illustrating a method for reporting information applied to a terminal according to an example embodiment.

FIG. 2 is a flowchart illustrating a method for reporting information according to an example embodiment. As illustrated in FIG. 2, the method is performed by a terminal. The method includes the following.

At step S11, a first random access message is determined from at least two types of random access messages supported by the terminal.

In embodiments of the disclosure, the terminal determines to support a plurality of random access messages through which the terminal capability information is reported, and the first random access message for reporting the terminal information is determined from the plurality of random access messages. It is noteworthy that the first access message may be one random access message or two or more random access messages.

At step S12, terminal information is reported based on the first random access message.

In embodiments of the disclosure, the terminal reports the terminal information based on the determined first random access message. The terminal information may include terminal information and/or channel state information of the terminal. The channel state information of the terminal may be a coverage situation of the terminal, such as a Reference Signal Receiving Power (RSRP) or a signal-to-noise interference ratio. The terminal can report the RSRP or the signal-to-noise interference ratio that represents the coverage situation of the terminal. The terminal information may be the terminal type and/or the terminal capability.

In some embodiments of the disclosure, the terminal type can be a high-end Redcap type that has a relatively high capability (high-end Redcap UE). For example, the high-end Redcap UE supports a bandwidth of 20 MHz and supports 2 antennas. The terminal type can be a low-end Redcap type which has a relatively low capability (low-end Redcap UE). For example, the low-end Redcap terminal supports a bandwidth of 20 MHz and supports 1 antenna. The terminal type can be other terminal types, which will not be exemplified here.

In some embodiments of the disclosure, the terminal capability may include any of: the number of antennas supported by the terminal, the transmitting and receiving bandwidth supported by the terminal, a duplex mode, or a modulation-demodulation mode supported by the terminal. For example, the terminal capability may be supporting 2 antennas or supporting 1 antenna. In some embodiments of the disclosure, the coverage situation of the terminal may be an RSRP measurement value. The coverage situation of the terminal may also be a situation where the RSRP measurement value satisfies a first threshold value. For example, if the RSRP measurement value of the terminal is greater than or equal to the first threshold value, it is determined that the coverage situation of the terminal is relatively good, and the coverage situation of the terminal that reports the capability information to the network device is relatively good. If the RSRP measurement value of the terminal is less than or equal to the first threshold value, it is determined that the coverage situation of the terminal is relatively poor, and the coverage situation of the terminal that reports the terminal capability information to the network device is relatively poor.

In the embodiments of the disclosure, the plurality of random access messages supported by the terminal for reporting the capability information at least include a first type of random access message and a second type of random access message. In some possible implementations, the first type of random access message can be the Msg. 1 in a random access process of the terminal. In other possible implementations, the second type of random access message can be the Msg. 3 in a random access process of the terminal. The above is only an example and is not used as a specific limitation herein.

In some embodiments of the disclosure, in response to the first type of random access message being the Msg. 1, a transmission resource of the Msg. 1 is determined. The transmission resource of the Msg. 1 is determined by the network device, for example, the network device assigns the resource for the Msg. 1 based on the terminal information. The transmission resource includes at least one of:

an initial BWP;

a PRACH transmission time;

a transmission frequency; or a preamble.

For example, as shown in Table 1, the first type of terminal corresponds to a first PRACH resource set and the second type of terminal corresponds to a second PRACH resource set.

TABLE 1

| Terminal information (UE information) | First type of terminal (Redcap type 1) | Second type of terminal (Redcap type 2) |
|---|---|---|
| Associated PRACH resource | First PRACH resource set (PRACH resource set 1) | Second PRACH resource set (PRACH resource set 2) |

It is understandable that each element in Table 1 exists independently of each other, and these elements are exemplarily listed in the same table, but it does not mean that all of the elements in the table must exist at the same time as shown in Table 1. The value of each of these elements is independent of any other element value in Table 1. Therefore, it is understandable by those skilled in the art that the value of each of the elements in Table 1 is an independent embodiment.

For example, as shown in Table 2, "first type of terminal and channel state value of the terminal is greater than the first threshold value" corresponds to a third PRACH resource set, "first type of terminal and channel state value of the terminal is less than the first threshold value" corresponds to a fourth PRACH resource set, "second type of terminal and channel state value of the terminal is less than the first threshold value" corresponds to a fifth PRACH resource set, and "second type of terminal and channel state value of the terminal is greater than the first threshold value" corresponds to a sixth PRACH resource set.

TABLE 2

| terminal information | First type of terminal and channel state value of terminal is greater than a first threshold value (Redcap type 1 and RSRP > Threshold 1) | First type of terminal and channel state value of terminal is less than a first threshold value (Redcap type 1 and RSRP < Threshold 1) | Second type of terminal and channel state value of terminal is less than a first threshold value (Redcap type 2 and RSRP < Threshold 1) | Second type of terminal and channel state value of terminal is greater than a first threshold value (Redcap type 2 and RSRP > Threshold 1) |
|---|---|---|---|---|
| Associated PRACH resource | Third PRACH resource set (PRACH resource set 3) | Fourth PRACH resource set (PRACH resource set 4) | Fifth PRACH resource set (PRACH resource set 5) | Sixth PRACH resource set (PRACH resource set 6) |

It is understandable that each of the elements in Table 2 exists independently of each other, and these elements are exemplarily listed in the same table, but it does not mean that all of the elements in the table must exist at the same time as shown in Table 2. The value of each of these elements is independent of any other element value in Table 2. Therefore, it is understandable by those skilled in the art that the value of each of the elements in Table 2 is an independent embodiment.

Figure 3:
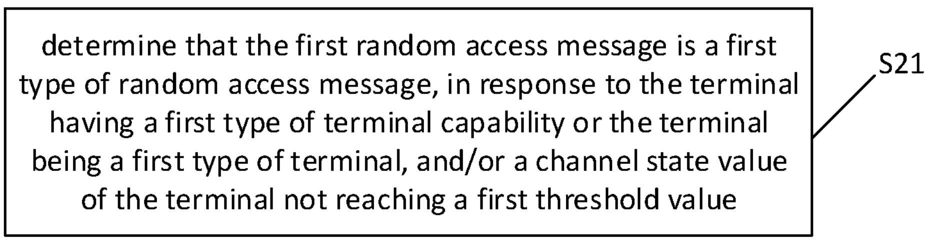
FIG. 3 is a flowchart illustrating another method for reporting information applied to a terminal according to an example embodiment.

FIG. 3 is a flowchart illustrating a method for reporting information according to an example embodiment. As illustrated in FIG. 3, the method for reporting the capability information is performed by a terminal, and the method may be performed independently, in combination with other embodiments of the disclosure, or in combination with the related art. The method includes the following.

At step S21, in response to the terminal having a first type of terminal capability or the terminal being a first type of terminal and/or a channel state value of the terminal not reaching a first threshold value, it is determined that the first random access message is a first type of random access message.

In embodiments of the disclosure, it is determined that the first random access message is the first type of random access message, in response to the terminal having a first type of terminal capability. In an implementation, it is determined that the first random access message is the first type of random access message, in response to the terminal being the first type of terminal. In an implementation, it is determined that the first random access message is the first type of random access message, in response to the channel state value of the terminal not reaching the first threshold value. In an implementation, it is determined that the first random access message is the first type of random access message, in response to the terminal having the first type of terminal capability and the channel state value of the terminal not reaching the first threshold value. In an implementation, it is determined that the first random access message is the first type of random access message, in response to the terminal being the first type of terminal and the channel state value of the terminal not reaching the first threshold value.

Figure 4:
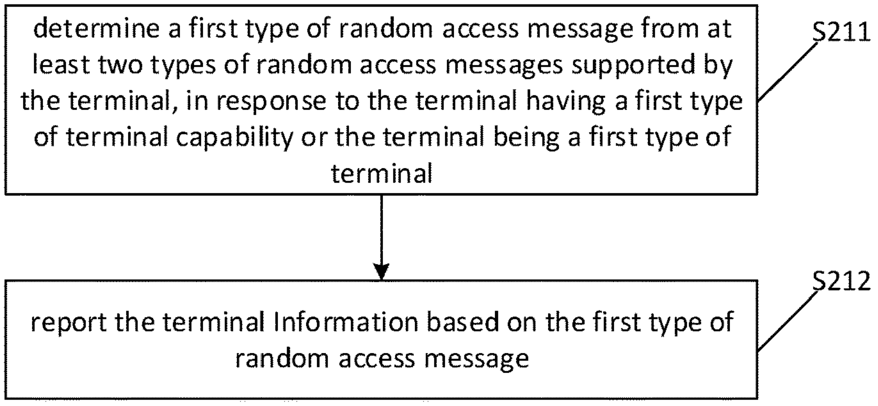
FIG. 4 is a flowchart illustrating another method for reporting information applied to a terminal according to an example embodiment.

FIG. 4 is a flowchart illustrating a method for reporting information according to an example embodiment. As illustrated in FIG. 4, the method is performed by a terminal, and the method may be performed independently, in combination with other embodiments of the disclosure, or in combination with the related art. The method includes the following.

In some embodiments, the step S21 may include a step S211 and a step S212. At step S211, the first type of random access message is determined from at least two types of random access messages supported by the terminal, in response to the terminal having a first type of terminal capability or the terminal being a first type of terminal. At step S212, the terminal information is reported based on the first type of random access message.

Figure 5:
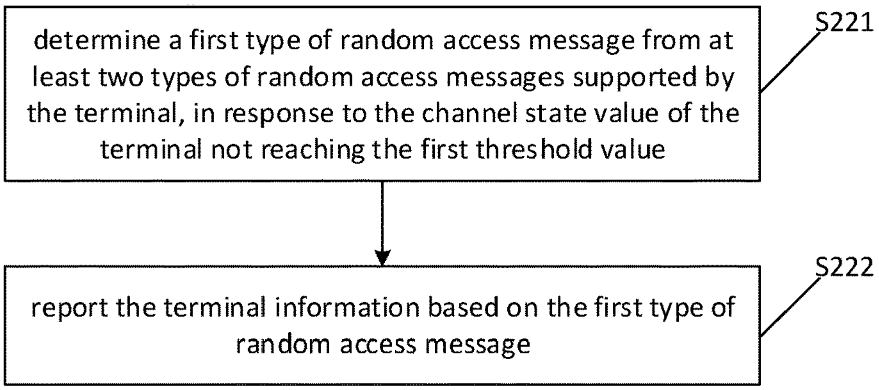
FIG. 5 is a flowchart illustrating another method for reporting information applied to a terminal according to an example embodiment.

FIG. 5 is a flowchart illustrating a method for reporting information according to an example embodiment. As illustrated in FIG. 5, the method is performed by a terminal, and the method may be performed independently, in combination with other embodiments of the disclosure, or in combination with the related art. The method includes the following.

In some possible implementations, the step S21 may include a step S221 and a step S222. At step S221, the first type of random access message is determined from at least two types of random access messages supported by the terminal, in response to the channel state value of the terminal not reaching the first threshold value. At step S222, the terminal information is reported based on the first type of random access message.

Figure 6:
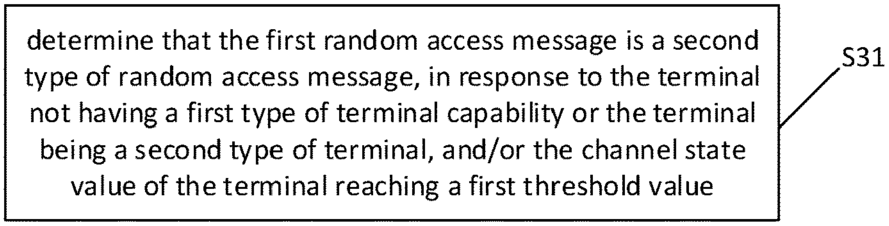
FIG. 6 is a flowchart illustrating another method for reporting information applied to a terminal according to an example embodiment.

FIG. 6 is a flowchart illustrating a method for reporting information according to an example embodiment. As illustrated in FIG. 6, the method is performed by a terminal, and the method may be performed independently, in combination with other embodiments of the disclosure, or in combination with the related art. The method includes the following.

At step S31, it is determined that the first random access message is a second type of random access message, in response to the terminal not having any first type of terminal capability or the terminal being a second type of terminal and/or the channel state value of the terminal reaches a first threshold value.

Figure 7:
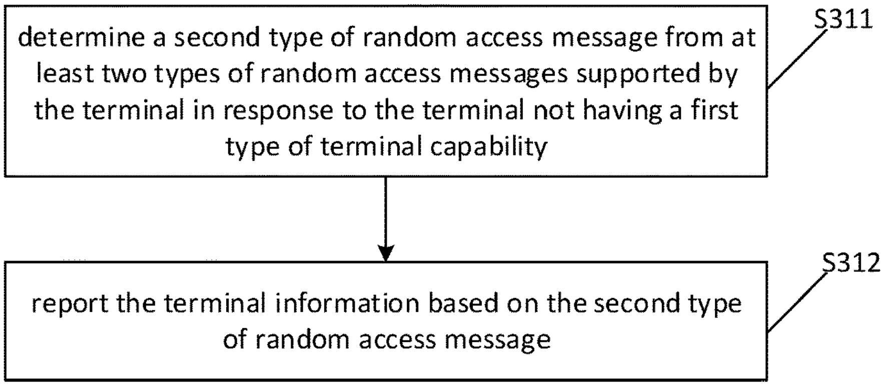
FIG. 7 is a flowchart illustrating another method for reporting information applied to a terminal according to an example embodiment.

FIG. 7 is a flowchart illustrating a method for reporting information according to an example embodiment. As illustrated in FIG. 7, the method is performed by a terminal, and the method may be performed independently, in combination with other embodiments of the disclosure, or in combination with the related art. The method includes the following.

In some embodiments, the step S31 may include a step S311 and a step S312. At step S311, the second type of random access message is determined from at least two types of random access messages supported by the terminal, in response to the terminal not having any first type of terminal capability. At step S312, the terminal information is reported based on the second type of random access message.

Figure 8:
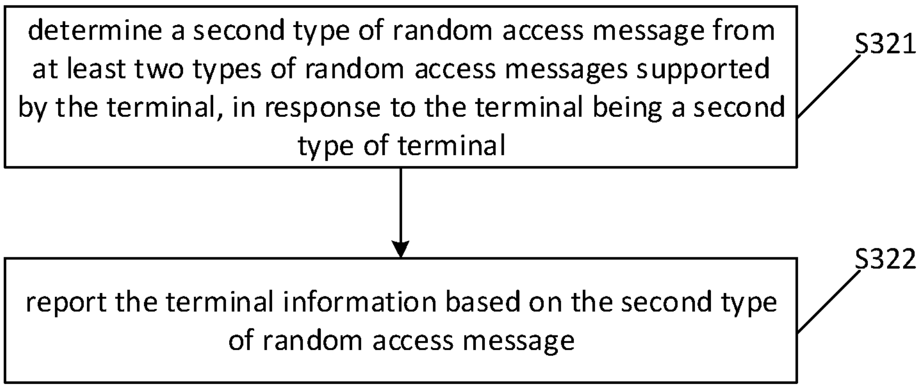
FIG. 8 is a flowchart illustrating another method for reporting information applied to a terminal according to an example embodiment.

FIG. 8 is a flowchart illustrating a method for reporting information according to an example embodiment. As illustrated in FIG. 8, the method is performed by a terminal, and the method may be performed independently, in combination with other embodiments of the disclosure, or in combination with the related art. The method includes the following.

In some possible implementations, the step S31 may include a step S321 and a step S322. At step S321, the second type of random access message is determined from at least two types of random access messages supported by the terminal, in response to the terminal being a second type of terminal. At step S322, the terminal information is reported based on the second type of random access message.

Figure 9:
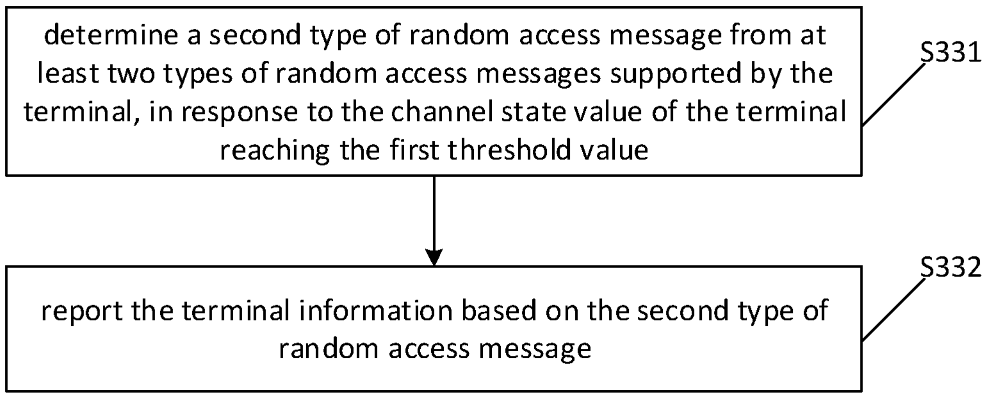
FIG. 9 is a flowchart illustrating another method for reporting information applied to a terminal according to an example embodiment.

FIG. 9 is a flowchart illustrating a method for reporting information according to an example embodiment. As illustrated in FIG. 9, the method is performed by a terminal, and the method may be performed independently, in combination with other embodiments of the disclosure, or in combination with the related art. The method includes the following.

In some possible implementations, the step S31 may include a step S331 and a step S332. At step S331, the second type of random access message is determined from at least two types of random access messages supported by the terminal, in response to the channel state value of the terminal reaching the first threshold value. At step S332, the terminal information is reported based on the second type of random access message.

In an implementation of the disclosure, it is determined that the first random access message is the second type of random access message, in response to the terminal not having any first type of terminal capability. In an implementation, it is determined that the first random access message is the second type of random access message, in response to the terminal being the second type of terminal. In an implementation, it is determined that the first random access message is the second type of random access message, in response to the channel state value of the terminal reaching the first threshold value. In an implementation, it is determined that the first random access message is the second type of random access message, in response to the terminal not having any first type of terminal capability and the channel state value of the terminal reaches the first threshold value. In an implementation, it is determined that the first random access message is the second type of random access message, in response to the terminal being the second type of terminal and the channel state value of the terminal reaching the first threshold value.

Figure 10:
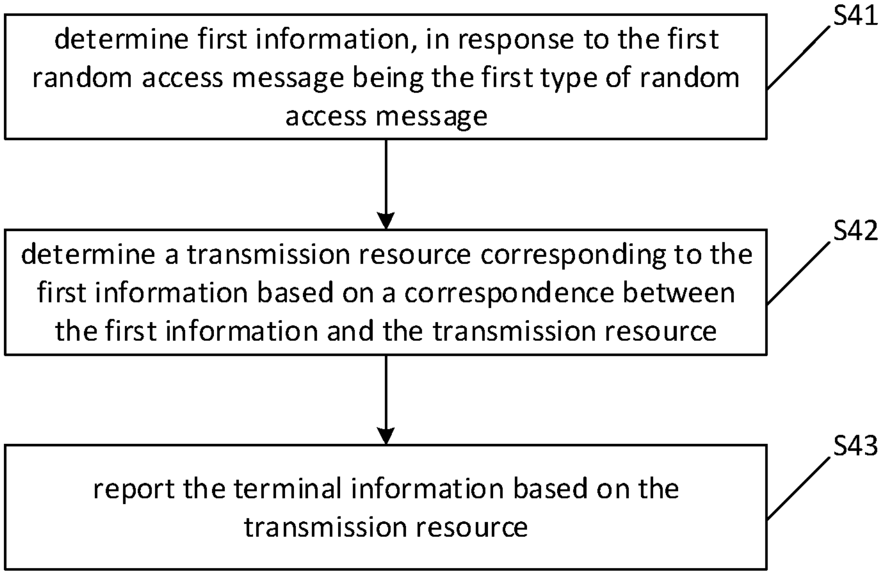
FIG. 10 is a flowchart illustrating another method for reporting information applied to a terminal according to an example embodiment.

FIG. 10 is a flowchart illustrating a method for reporting information according to an example embodiment. As illustrated in FIG. 10, the method is performed by a terminal, and the method may be performed independently, in combination with other embodiments of the disclosure, or in combination with the related art. The method includes the following.

At step S41, first information is determined, in response to that the first random access message being the first type of random access message.

In the embodiment of the disclosure, the first information includes at least one of a terminal capability, a terminal type or a channel state value of the terminal. The first type of random access message includes a plurality of transmission resources for representing the terminal information. In the embodiment of the disclosure, it is determined that the first random access message configured by the network side for the terminal for reporting the terminal information is the first type of random access message, and the terminal information is further determined.

At step S42, a transmission resource corresponding to the first information is determined based on a correspondence between the first information and the transmission resource.

In the embodiment of the disclosure, the correspondence between the terminal information and the PRACH resource set of Msg. 1 is determined based on the communication protocol, the terminal determines the terminal information and then determines the transmission resource corresponding to the terminal information.

In some embodiments, the method further includes a step S43.

At step S43, the terminal information is reported based on the transmission resource.

In an implementation of the disclosure, the first information includes the terminal type. As shown in Table 1, the terminal information is reported based on a first PRACH resource set, in response to that the terminal type being the first type. In an implementation, the first information includes the terminal type and the channel state value of the terminal. As shown in Table 2, the terminal information is reported based on a first PRACH resource set, in response to that the terminal type being the first type and the channel state value of the terminal being greater than the first threshold value.

Figure 11:
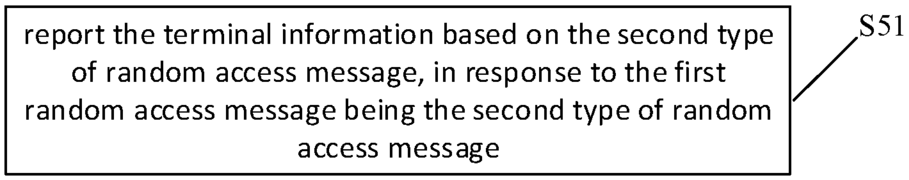
FIG. 11 is a flowchart illustrating another method for reporting information applied to a terminal according to an example embodiment.

FIG. 11 is a flowchart illustrating a method for reporting information according to an example embodiment. As illustrated in FIG. 11, the method is performed by a terminal, and the method may be performed independently, in combination with other embodiments of the disclosure, or in combination with the related art. The method includes the following.

At step S51, the terminal information is reported based on the second type of random access message, in response to that the first random access message being the second type of random access message.

In the embodiment of the disclosure, it is determined that the first random access message configured by the network side for the terminal for reporting the terminal information is the second type of random access message, and then the terminal information is reported based on the second type of random access message.

Figure 12:
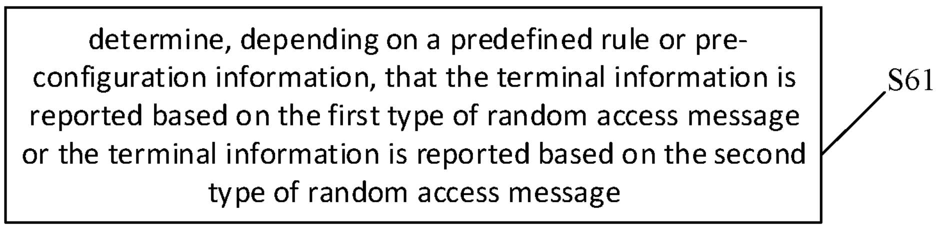
FIG. 12 is a flowchart illustrating another method for reporting information applied to a terminal according to an example embodiment.

FIG. 12 is a flowchart illustrating a method for reporting information according to an example embodiment. As illustrated in FIG. 12, the method is performed by a terminal, and the method may be performed independently, in combination with other embodiments of the disclosure, or in combination with the related art. The method includes the following.

At step S61, it is determined, depending on a predefined rule or pre-configuration information, that the terminal information is reported based on the first type of random access message or the terminal information is reported based on the second type of random access message. The first random access message is the first type of random access message or the second type of random access message.

In the embodiment of the disclosure, it is determined that the first random access message configured by the network device for the terminal includes the first type of random access message and the second type of random access message, and then the terminal determines its own terminal information and determines to report the terminal information based on the first type of random access message or report the terminal information based on the second type of random access message based on the terminal information.

In the embodiment of the disclosure, the pre-configuration information is carried by a system message. The terminal determines, based on the received system message, the first random access message for reporting the terminal information.

For example, as shown in Table 3, if the channel state value of the terminal included in the terminal information is less than the first threshold value, the terminal reports the terminal information based on the first type of random access message (e.g., Msg. 1) and determines to report the terminal information based on the seventh PRACH resource set. If the channel state value of the terminal included in the terminal information is greater than the first threshold value, the terminal reports the terminal information based on the second type of random access message (e.g., Msg. 3).

TABLE 3

| Terminal information (UE information) | type of random access message for reporting terminal information | corresponding resource |
|---|---|---|
| Channel state value of terminal is less than first threshold value (Redcap UE RSRP < Threshold 1) | First type of random access message (Msg. 1 based) | Seventh PRACH resource set (PRACH resource set 7) |
| Channel state value of terminal is greater than first threshold value (Redcap UE RSRP > Threshold 1) | Second type of random access message (Msg. 3 based) | Msg. 3 |

It is understandable that each of the elements in Table 3 exists independently of each other, and these elements are exemplarily listed in the same table, but it does not mean that all of the elements in the table must exist at the same time as shown in Table 3. The value of each of these elements is independent of any other element value in Table 3. Therefore, it is understandable by those skilled in the art that the value of each of the elements in Table 3 is an independent embodiment.

Figure 13:
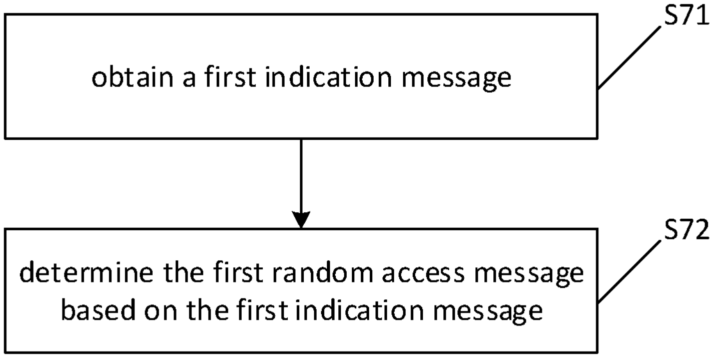
FIG. 13 is a flowchart illustrating another method for reporting information applied to a terminal according to an example embodiment.

FIG. 13 is a flowchart illustrating a method for reporting information according to an example embodiment. As illustrated in FIG. 13, the method is performed by a terminal, and the method may be performed independently, in combination with other embodiments of the disclosure, or in combination with the related art. The method includes the following.

At step S71, a first indication message is obtained.

In the embodiment of the disclosure, the first indication message is configured to indicate a random access message through which the terminal reports the terminal information. The first indication message may be a system message. The terminal receives the first indication message sent by the network device.

At step S72, the first random access message is determined based on the first indication message.

In the embodiment of the disclosure, the terminal determines, based on a way for reporting the terminal information indicated by the first indication message, the first random access message for reporting the terminal information.

In the embodiment of the disclosure, the terminal may obtain the first indication message based on the following ways.

Figure 14:
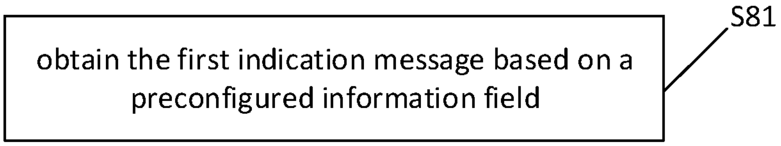
FIG. 14 is a flowchart illustrating another method for reporting information applied to a terminal according to an example embodiment.

FIG. 14 is a flowchart illustrating a method for reporting information according to an example embodiment. As illustrated in FIG. 14, the method is performed by a terminal, and the method may be performed independently, in combination with other embodiments of the disclosure, or in combination with the related art. The method includes the following.

At step S81, the first indication message is obtained based on a preconfigured information field.

In the embodiment of the disclosure, the network device may indicate the first random access message to be used by the terminal for reporting the terminal information via an explicit signaling, such as via a configured information field. In response to a value of the information field being 1, the first type of random access message (e.g., the Msg. 1) is used to report the terminal information, and in response to the value of the information field being 0, the second type of random access message (e.g., the Msg. 3) is used to report the terminal information.

Figure 15:
FIG. 15 is a flowchart illustrating another method for reporting information applied to a terminal according to an example embodiment.

FIG. 15 is a flowchart illustrating a method for reporting information according to an example embodiment. As illustrated in FIG. 15, the method is performed by a terminal, and the method may be performed independently, in combination with other embodiments of the disclosure, or in combination with the related art. The method includes the following.

At step S91, the first indication message is obtained based on a PRACH.

In the embodiment of the disclosure, the network device may indicate, via an implicit signaling, the first random access message to be used by the terminal for reporting the terminal information. The division of PRACH resource is taken as an example. In response to the terminal assigning a resource used for the early indication for the Redcap terminal in the PRACH resource, it is determined that the terminal reports the terminal information based on the corresponding transmission resource represented by the first type of random access message (e.g., the Msg. 1). In response to the terminal not assigning the resource used for the early indication for the Redcap terminal in the PRACH resource, it is determined that the terminal reports the terminal information based on the second type of random access message (e.g., the Msg. 3).

In the embodiment of the disclosure, the first access resource is determined based on the terminal information, for reporting the terminal information, in response to the terminal determining that the plurality of random access messages are supported for reporting the terminal information. For example, in an implementation, the terminal information includes the terminal capability, the terminal capability includes the number of receiving antennas. It is determined that the first type of random access message is determined from the plurality of random access messages, and it is determined that the terminal information is reported based on the first type of random access message (i.e., the Msg. 1). The corresponding transmission resource is determined based on the number of receiving antennas, in which the transmission resource has been described in the above embodiments. In an implementation, the terminal determines that the supported modulation mode is 256 Quadrature Amplitude Modulation (QAM), determines the second type of random access message from the plurality of random access messages, and determines to report the terminal information based on the second type of random access message (i.e., the Msg. 3).

Based on the same/similar concept, the disclosure also provides a method for reporting information.

Figure 16:
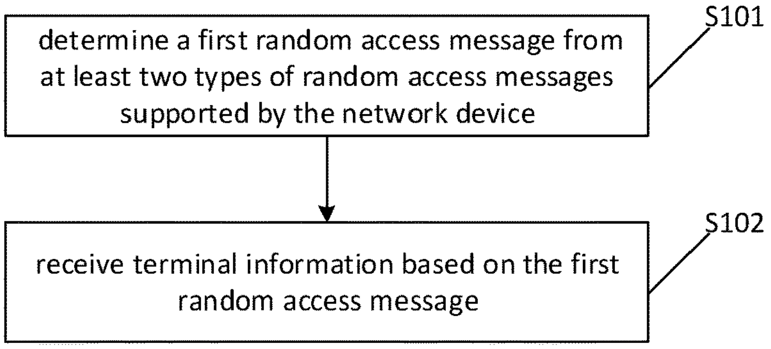
FIG. 16 is a flowchart illustrating a method for reporting information applied to a network device according to an example embodiment.

FIG. 16 is a flowchart illustrating a method for reporting information according to an example embodiment. As illustrated in FIG. 16, the method is performed by a network device, and the method may be performed independently, in combination with other embodiments of the disclosure, or in combination with the related art. The method includes the following.

At step S101, a first random access message is determined from at least two types of random access messages supported by the network device.

In the embodiment of the disclosure, the network device determines a plurality of random access messages that support reporting the terminal capability information, and the first random access message for reporting the terminal information is determined from the plurality of random access messages. It is noteworthy that the first access message may be one random access message or two or more random access messages.

At step S102, the terminal information is received based on the first random access message.

In the embodiment of the disclosure, the network device receives the terminal information based on the determined first random access message. The terminal information may include terminal information and/or channel state information of the terminal. The channel state information of the terminal may be a coverage situation of the terminal, such as a RSRP or a signal-to-noise interference ratio, such that the terminal reports the RSRP or the signal-to-noise interference ratio that represents the coverage situation of the terminal. The terminal information may be a terminal type and/or a terminal capability.

In some embodiments of the disclosure, the terminal type can be a high-end Redcap type having a relatively high capability (high-end Redcap UE). For example, the high-end Redcap UE supports a bandwidth of 20 MHz and supports 2 antennas. The terminal type can be a low-end Redcap type having a relatively low capability (low-end Redcap UE). For example, the low-end Redcap UE supports a bandwidth of 20 MHz and supports 1 antenna. The terminal type can be other terminal types, which will not be exemplified here.

In some embodiments of the disclosure, the terminal capability may include any of: the number of antennas supported by the terminal, the transmitting and receiving bandwidth supported by the terminal, a duplex mode, or a modulation-demodulation mode supported by the terminal. For example, the terminal capability may be supporting 2 antennas or supporting 1 antenna.

In some embodiments of the disclosure, the coverage situation of the terminal may be an RSRP measurement value. The coverage situation of the terminal may be a situation where the RSRP measurement value satisfies a first threshold value. For example, if the RSRP measurement value of the terminal is greater than or equal to the first threshold value, it is determined that the coverage situation of the terminal is relatively good, and the coverage situation of the terminal that reports the terminal capability information to the network device is relatively good. If the RSRP measurement value of the terminal is less than or equal to the first threshold value, it is determined that the coverage situation of the terminal is relatively poor, and the coverage situation of the terminal that reports the capability information to the network device is relatively poor.

In the embodiments of the disclosure, the plurality of random messages supported by the terminal for reporting the capability information at least include a first type of random access message and a second type of random access message. For example, the first type of random access message can be the Msg.1 in a random access process of the terminal, and the second type of random access message can be the Msg.3 in a random access process of the terminal. The above is only an example and is not used as a specific limitation herein.

In some embodiments of the disclosure, a transmission resource of Msg. 1 is determined, in response to the first type of random access message being the Msg. 1. The transmission resource of Msg. 1 is determined by the network device, for example, the network device assigns the resource for the Msg. 1 based on the terminal information. The transmission resource includes at least one of:

an initial BWP;

a PRACH transmission time;

a transmission frequency; or a preamble.

For example, as shown in Table 1, the first type of terminal corresponds to the first PRACH resource set, and the second type of terminal corresponds to the second PRACH resource set.

For example, as shown in Table 2, "the first type of terminal and the channel state value of the terminal is greater than the first threshold value" corresponds to the third PRACH resource set, "the first type of terminal and the channel state value of the terminal is less than the first threshold value" corresponds to the fourth PRACH resource set, "the second type of terminal and the channel state value of the terminal is less than the first threshold value" corresponds to the fifth PRACH resource set, and "the second type of terminal and the channel state value of the terminal is greater than the first threshold value" corresponds to the sixth PRACH resource set.

Figure 17:
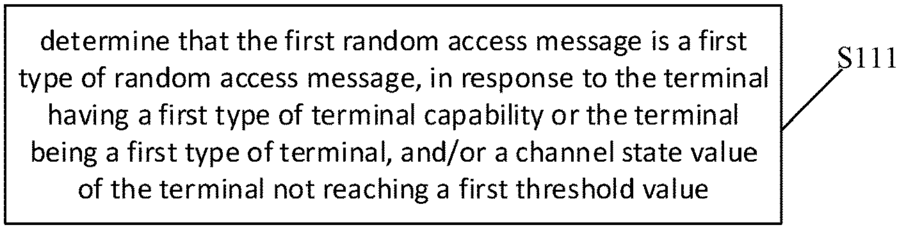
FIG. 17 is a flowchart illustrating another method for reporting information applied to a network device according to an example embodiment.

FIG. 17 is a flowchart illustrating a method for reporting information according to an example embodiment. As illustrated in FIG. 17, the method is performed by a network device, and the method may be performed independently, in combination with other embodiments of the disclosure, or in combination with the related art. The method includes the following.

At step S111, it is determined that the first random access message is a first type of random access message, in response to the terminal having a first type of terminal capability or the terminal being a first type of terminal, and/or a channel state value of the terminal not reaching a first threshold value.

In an embodiment of the disclosure, it is determined that the first random access message is the first type of random access message, in response to the terminal having the first type of terminal capability. In an implementation, it is determined that the first random access message is the first type of random access message, in response to the terminal being a first type of terminal. In an implementation, it is determined that the first random access message is the first type of random access message, in response to the channel state value of the terminal not reaching the first threshold value. In an implementation, it is determined that the first random access message is the first type of random access message, in response to the terminal having the first type of terminal capability and the channel state value of the terminal not reaching the first threshold value. In an implementation, it is determined that the first random access message is the first type of random access message, in response to the terminal being the first type of terminal and the channel state value of the terminal not reaching the first threshold value.

Figure 18:
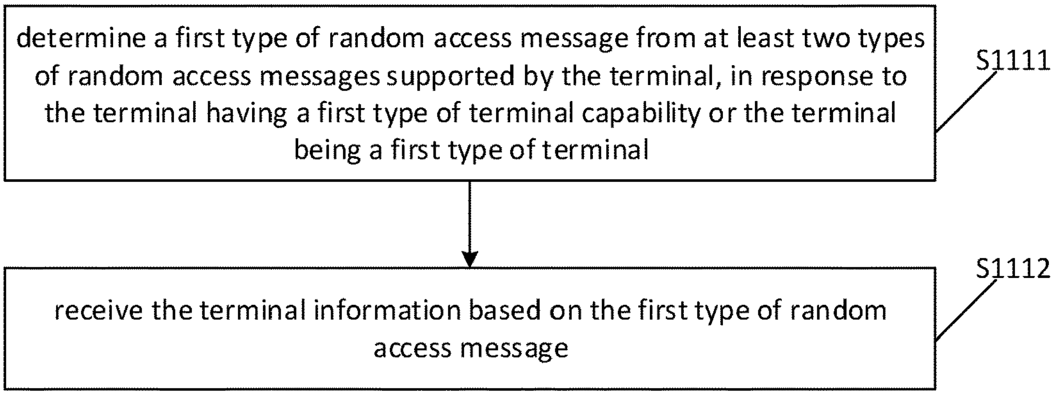
FIG. 18 is a flowchart illustrating another method for reporting information applied to a network device according to an example embodiment.

FIG. 18 is a flowchart illustrating a method for reporting information according to an example embodiment. As illustrated in FIG. 18, the method is performed by a network device, and the method may be performed independently, in combination with other embodiments of the disclosure, or in combination with the related art. The method includes the following.

In some embodiments, the step S111 may include a step S1111 and step a S1112. At step S1111, the first type of random access message is determined from at least two types of random access messages supported by the terminal, in response to the terminal having the first type of terminal capability or the terminal being the first type of terminal. At step S1112, the terminal information is received based on the first type of random access message.

Figure 19:
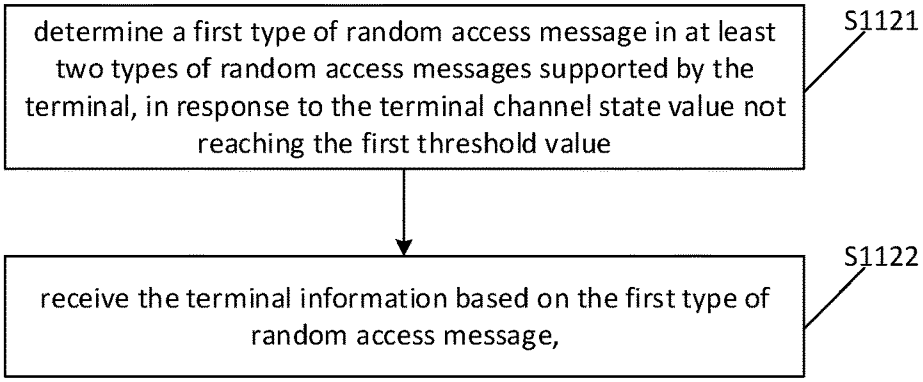
FIG. 19 is a flowchart illustrating another method for reporting information applied to a network device according to an exemplary embodiment.

FIG. 19 is a flowchart illustrating a method for reporting information according to an example embodiment. As illustrated in FIG. 19, the method is performed by a network device, and the method may be performed independently, in combination with other embodiments of the disclosure, or in combination with the related art. The method includes the following.

In some possible embodiments, the step S111 may include a step S1121 and a step S1122. At step S1121, the first type of random access message is determined from at least two types of random access messages supported by the terminal, in response to the channel state value of the terminal not reaching the first threshold value. At step S222, the terminal information is received based on the first type of random access message.

Figure 20:
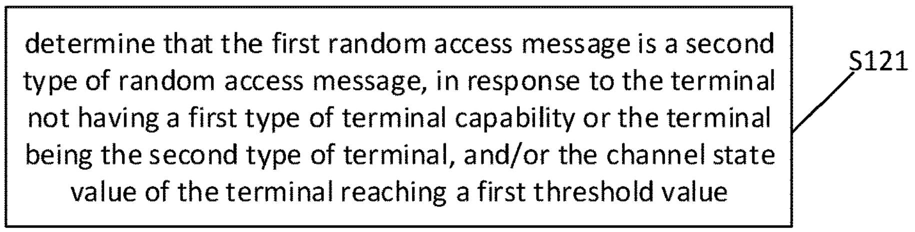
FIG. 20 is a flowchart illustrating another method for reporting information applied to a network device according to an example embodiment.

FIG. 20 is a flowchart illustrating a method for reporting information according to an example embodiment. As illustrated in FIG. 20, the method is performed by a network device, and the method may be performed independently, in combination with other embodiments of the disclosure, or in combination with the related art. The method includes the following.

At step S121, it is determined that the first random access message is a second type of random access message, in response to the terminal not having a first type of terminal capability or the terminal being a second type of terminal, and/or the channel state value of the terminal reaching a first threshold value.

In an implementation of the disclosure, it is determined that the first random access message is a second type of random access message, in response to the terminal not having a first type of terminal capability. In an implementation, it is determined that the first random access message is a second type of random access message, in response to the terminal being the second type of terminal. In an implementation, it is determined that the first random access message is a second type of random access message, in response to the channel state value of the terminal reaching the first threshold value. In an implementation, it is determined that the first random access message is the second type of random access message, in response to the terminal not having the first type of terminal capability and the channel state value of the terminal reaching the first threshold value. In an implementation, it is determined that the first random access message is the second type of random access message, in response to the terminal being the second type of terminal and the channel state value of the terminal reaching the first threshold value.

Figure 21:
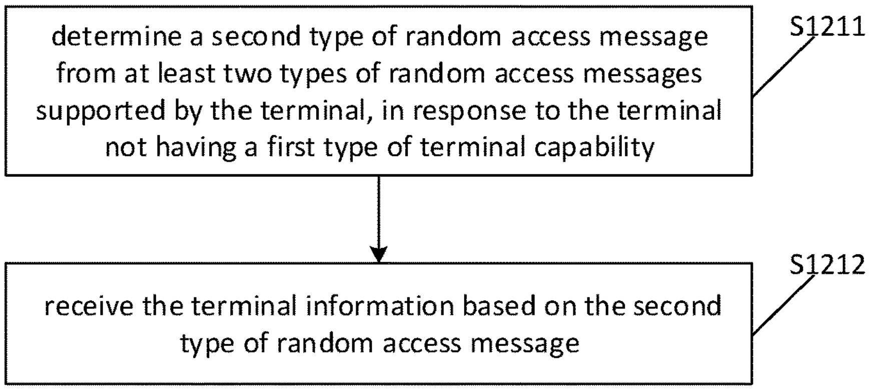
FIG. 21 is a flowchart illustrating another method for reporting information applied to a network device according to an exemplary embodiment.

FIG. 21 is a flowchart illustrating a method for reporting information according to an example embodiment. As illustrated in FIG. 21, the method is performed by a network device, and the method may be performed independently, in combination with other embodiments of the disclosure, or in combination with the related art. The method includes the following.

In some embodiments, the step S121 may include a step S1211 and step a S1212. At step S1211, the second type of random access message is determined from at least two types of random access messages supported by the terminal, in response to the terminal not having a first type of terminal capability. At step S1212, the terminal information is received based on the second type of random access message.

Figure 22:
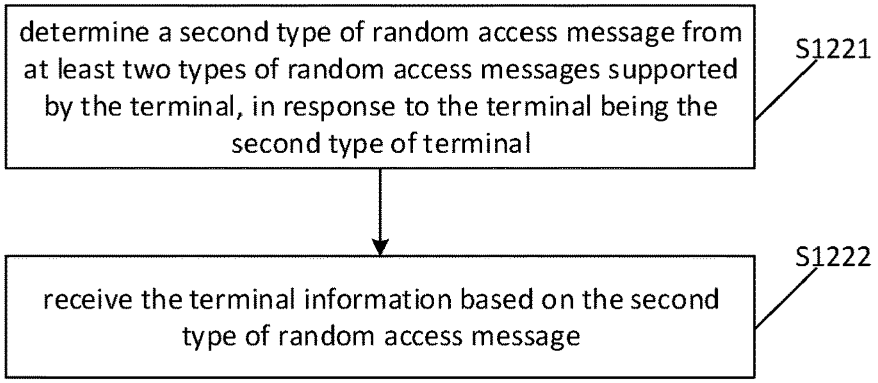
FIG. 22 is a flowchart illustrating another method for reporting information applied to a network device according to an example embodiment.

FIG. 22 is a flowchart illustrating a method for reporting information according to an example embodiment. As illustrated in FIG. 22, the method is performed by a network device, and the method may be performed independently, in combination with other embodiments of the disclosure, or in combination with the related art. The method includes the following.

In some possible embodiments, the step S121 may include a step S1221 and a step S1222. At step S1221, the second type of random access message is determined from at least two types of random access messages supported by the terminal, in response to the terminal being the second type of terminal. At step S1222, the terminal information is received based on the second type of random access message.

Figure 23:
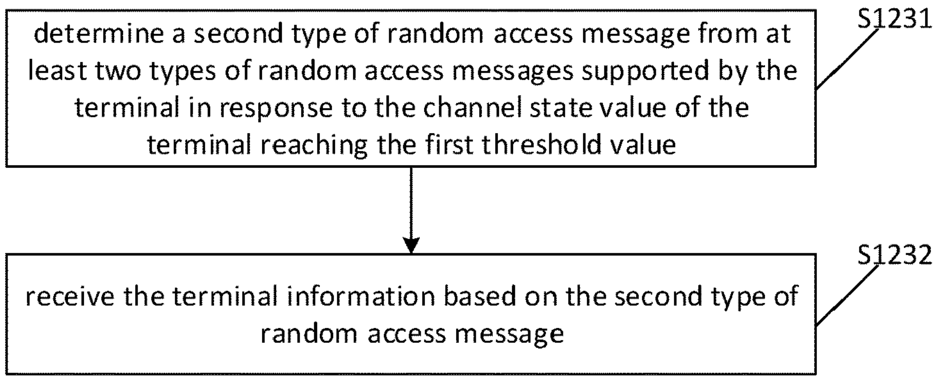
FIG. 23 is a flowchart illustrating another method for reporting information applied to a network device according to an example embodiment.

FIG. 23 is a flowchart illustrating a method for reporting information according to an example embodiment. As illustrated in FIG. 23, the method is performed by a network device, and the method may be performed independently, in combination with other embodiments of the disclosure, or in combination with the related art. The method includes the following.

In some possible embodiments, the step S121 may include step a S1231 and a step S1232. At step S1231, the second type of random access message is determined from at least two types of random access messages supported by the terminal, in response to the channel state value of the terminal reaching the first threshold value. At step S1222, the terminal information is received based on the second type of random access message.

In the above embodiments, one or more of that the terminal does not have the first terminal capability, the terminal is the second type of terminal and the channel state value of the terminal reaches the first threshold value can be used as condition(s) for determining the type of the employed random access message. In some embodiments, the network device may determine one or more of the above parameters of the terminal according to various related techniques, which will not be repeated herein.

Figure 24:
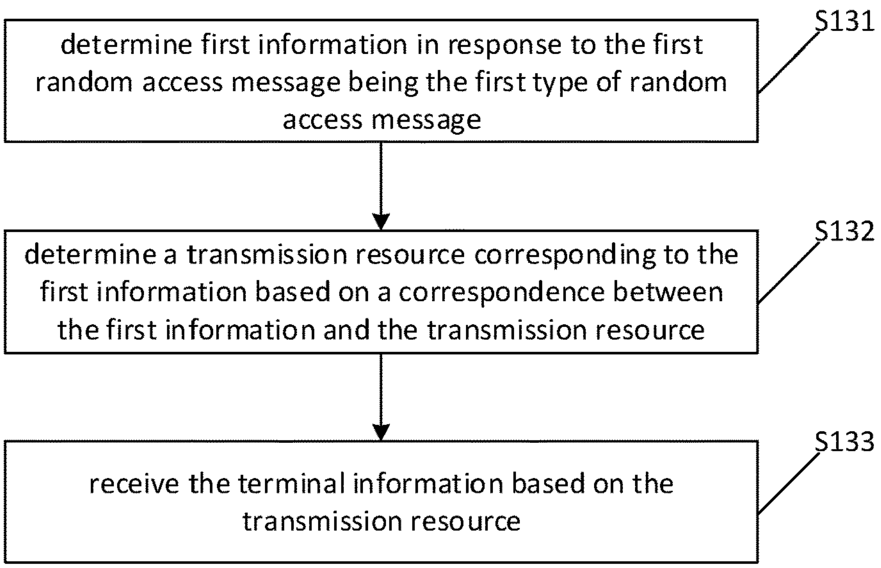
FIG. 24 is a flowchart illustrating another method for reporting information applied to a network device according to an example embodiment.

FIG. 24 is a flowchart illustrating a method for reporting information according to an example embodiment. As illustrated in FIG. 24, the method is performed by a network device, and the method may be performed independently, in combination with other embodiments of the disclosure, or in combination with the related art. The method includes the following.

At step S131, first information is determined in response to the first random access message being the first type of random access message.

In the embodiment of the disclosure, the first information includes at least one of the terminal capability, the terminal type and the channel state value of the terminal, and the first type of random access message includes a plurality of transmission resources for representing the terminal information. In the embodiment of the disclosure, it is determined that the first random access message configured by the network side for the terminal for reporting the terminal information is the first type of random access message, and further the terminal information is determined.

At step S132, a transmission resource corresponding to the first information is determined based on a correspondence between the first information and the transmission resource.

In the embodiment of the disclosure, the correspondence between the terminal information and the PRACH resource set of the Msg. 1 is determined based on the communication protocol, the terminal information of the terminal is determined, and the transmission resource corresponding to the terminal information is determined.

In some embodiments, the method further includes a step S133.

At step S133, the terminal information is received based on the transmission resource.

In an implementation of the disclosure, the first information includes the terminal type. As shown in Table 1, the terminal information is reported based on a first PRACH resource set, in response to the terminal type being a first type of terminal. In an implementation, the first information includes the terminal type and the channel state value of the terminal. As shown in Table 2, the terminal information is reported based on the third PRACH resource set, in response to the terminal type being the first type of terminal and the channel state value of the terminal being greater than the first threshold value.

Figure 25:
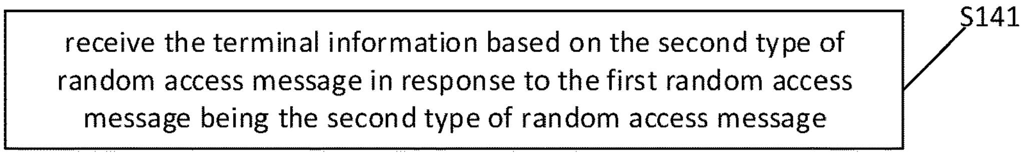
FIG. 25 is a flowchart illustrating another method for reporting information applied to a network device according to an example embodiment.

FIG. 25 is a flowchart illustrating a method for reporting information according to an example embodiment. As illustrated in FIG. 25, the method is applied to a network device, and the method may be performed independently, in combination with other embodiments of the disclosure, or in combination with the related art. The method includes the following.

At step S141, in response to the first random access message being the second type of random access message, the terminal information is received based on the second type of random access message.

In the embodiment of the disclosure, it is determined that the first random access message configured by the network side for the terminal for receiving the terminal information is the second type of random access message, and the terminal information is received based on the second type of random access message.

Figure 26:
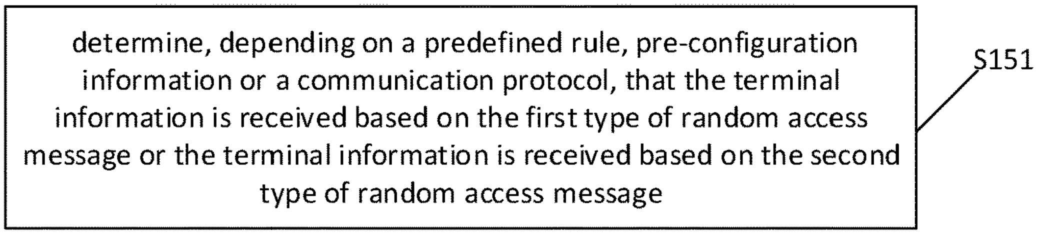
FIG. 26 is a flowchart illustrating another method for reporting information applied to a network device according to an exemplary embodiment.

FIG. 26 is a flowchart illustrating a method for reporting information according to an example embodiment. As illustrated in FIG. 26, the method is performed by a network device, and the method may be performed independently, in combination with other embodiments of the disclosure, or in combination with the related art. The method includes the following.

At step S151, it is determined, depending on a predefined rule, pre-configuration information or a communication protocol, that the terminal information is received based on the first type of random access message or the terminal information is received based on the second type of random access message.

In some embodiments, the at least two types of random access messages supported by the terminal include: a first type of random access message and a second type of random access message. That is, the first random access message may be the first type of random access message or the second type of random access message. In the embodiment of the disclosure, it is determined that the at least two types of random access messages configured by the network device for the terminal, including the first type of random access message and the second type of random access message. The terminal reports its own terminal information, and the network device determines that the terminal information is received based on the first type of random access message or the terminal information is received based on the second type of random access message.

In the embodiment of the disclosure, the pre-configuration information is carried by a system message. The terminal determines, based on the received system message, the first random access message for reporting the terminal information.

For example, as shown in Table 3, the channel state value of the terminal contained in the terminal information is less than the first threshold value, and then it is determined that the terminal information is received based on the first type of random access message (e.g., the Msg. 1) and it is further determined to receive the terminal information based on the seventh PRACH resource set. The channel state value of the terminal contained in the terminal information is greater than the first threshold value, and then it is determined that the terminal information is received based on the second type of random access message (e.g., the Msg. 3).

Figure 27:
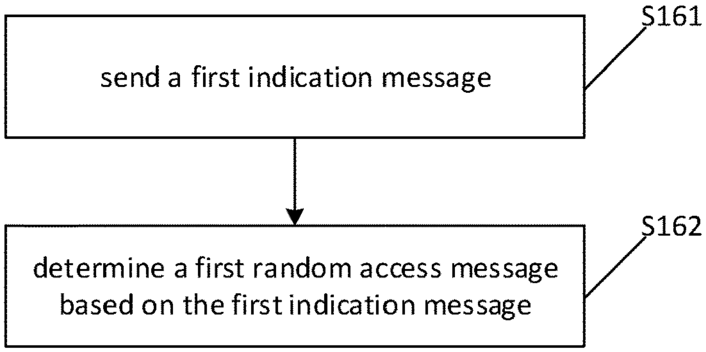
FIG. 27 is a flowchart illustrating another method for reporting information applied to a network device according to an example embodiment.

FIG. 27 is a flowchart illustrating a method for reporting information according to an example embodiment. As illustrated in FIG. 27, the method is performed by a network device, and the method may be performed independently, in combination with other embodiments of the disclosure, or in combination with the related art. The method includes the following.

At step S161, a first indication message is sent.

In the embodiment of the disclosure, the first indication message is used to indicate a random access message through which the terminal reports the terminal information. The first indication message may be a system message. The terminal receives the first indication message sent by the network device.

At step S162, a first random access message is determined based on the first indication message.

In the embodiment of the disclosure, the terminal determines, based on a way for reporting the terminal information indicated by the first indication message, the first random access message for reporting the terminal information.

In the embodiment of the disclosure, the network device may send the first indication message based on the following ways.

Figure 28:
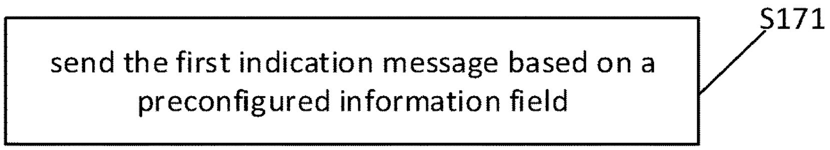
FIG. 28 is a flowchart illustrating another method for reporting information applied to a network device according to an example embodiment.

FIG. 28 is a flowchart illustrating a method for reporting information according to an example embodiment. As illustrated in FIG. 28, the method is performed by a network device, and the method may be performed independently, in combination with other embodiments of the disclosure, or in combination with the related art. The method includes the following.

At step S171, the first indication message is sent based on a preconfigured information field.

In the embodiment of the disclosure, the network device may indicate, via an explicit signaling, the first random access message to be used by the terminal for reporting the terminal information, for example via configuring an information field. The first type of random access message (e.g., the Msg. 1) is used to receive the terminal information in response to a value of the information field being 1, and the second type of random access message (e.g., the Msg. 3) is used to receive the terminal information in response to the value of the information field being 0.

Figure 29:
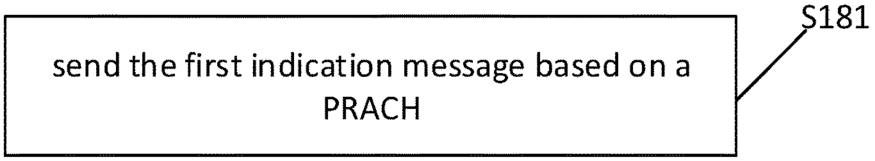
FIG. 29 is a flowchart illustrating another method for reporting information applied to a network device according to an exemplary embodiment.

FIG. 29 is a flowchart illustrating a method for reporting information according to an example embodiment. As illustrated in FIG. 29, the method is performed by a network device, and the method may be performed independently, in combination with other embodiments of the disclosure, or in combination with the related art. The method includes the following.

At step S181, the first indication message is sent based on a PRACH.

In the embodiment of the disclosure, the network device may indicate, via an implicit signaling, the first random access message to be used by the terminal for receiving the terminal information. The division of the PRACH resource is taken as an example. It is determined that the terminal receives the terminal information based on the corresponding transmission resource represented by the first type of random access message (e.g., the Msg. 1) in response to the terminal assigning a resource used for the early indication for the Redcap terminal in the PRACH resource. It is determined that the terminal receives the terminal information based on the second type of random access message (e.g., the Msg. 3) in response to the terminal not assigning the resource used for the early indication for the Redcap terminal in the PRACH resource.

In the embodiment of the disclosure, in response to the terminal determining that the plurality of random access messages are supported for reporting the terminal information, the first access resource is determined based on the terminal information, for reporting the terminal information. For example, in an implementation, the terminal information includes the terminal capability. The terminal capability includes the number of receiving antennas. It is determined that the first type of random access message is determined from the plurality of random access messages, and it is determined that the terminal information is reported based on the first type of random access message (i.e., the Msg. 1). The corresponding transmission resource is determined based on the number of receiving antennas, in which the transmission resource has been described in the above embodiments. In an implementation, the terminal determines that the supported modulation mode is 256 QAM, determines that the second type of random access message is determined from the plurality of random access messages, and determines to report the terminal information based on the second type of random access message (i.e., the Msg. 3).

Based on the same/similar concept, the disclosure also provides an apparatus for reporting information.

It is understandable that the apparatus for reporting information according to embodiments of the disclosure includes corresponding hardware structures and/or software modules that perform the respective functions to achieve the above functions. In combination with the units and algorithmic steps of each example disclosed in the embodiments of the disclosure, the embodiments of the disclosure can be implemented in the form of hardware or a combination of hardware and computer software. Whether a particular function is performed as hardware or by hardware driven by computer software depends on the particular application and design constraint conditions of the technical solution. Those skilled in the art may use a different approach for each particular application to implement the described function, but such implementation should not be considered as beyond the scope of the technical solution of the embodiments of the disclosure.

Figure 30:
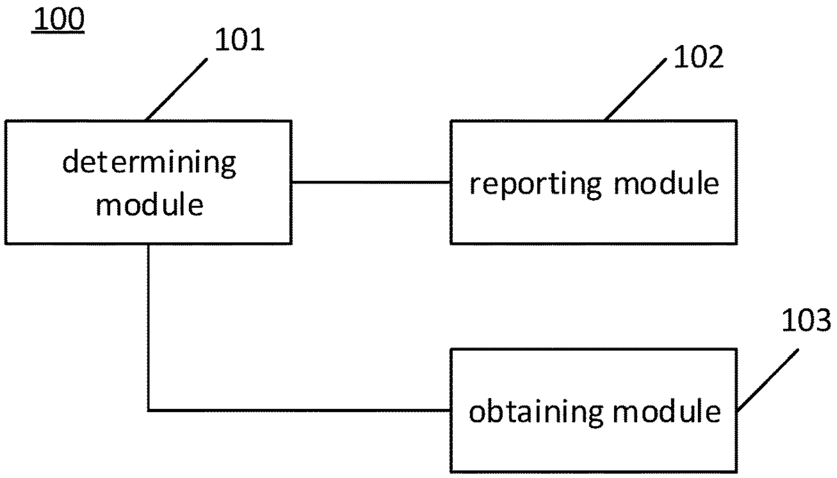
FIG. 30 is a block diagram illustrating an apparatus for reporting information applied to a terminal according to an example embodiment.

FIG. 30 is a block diagram illustrating an apparatus for reporting information according to an example embodiment. As illustrated in FIG. 30, the apparatus 100, applied to a terminal, includes: a determining module 101 and a reporting module 102.

The determining module 101 is configured to determine a first random access message from a plurality of random access messages supported by the terminal.

The reporting module 102 is configured to report terminal information based on the first random access message. The terminal information includes terminal capability information and/or channel state information of the terminal.

In the embodiment of the disclosure, the plurality of random access messages at least include a first type of random access message and a second type of random access message.

In the embodiment of the disclosure, the determining module 101 is configured to: determine that the first random access message is the first type of random access message in response to the terminal having a first type of terminal capability or the terminal being a first terminal type, and/or a channel state value of the terminal not reaching a first threshold value or the channel state value of the terminal reaching the first threshold value.

In the embodiment of the disclosure, the determining module 101 is configured to: determine that the first random access message is the second type of random access message in response to the terminal not having a first type of terminal capability or the terminal being a second type of terminal and/or a channel state value of the terminal reaching a first threshold value or the channel state value of the terminal not reaching the first threshold value.

In the embodiment of the disclosure, the reporting module 102 is configured to: determine first information in response to the first random access message being the first type of random access message, in which the first information includes at least one of a terminal capability, a terminal type or a channel state value of the terminal, and the first type of random access message includes a plurality of transmission resources for representing the terminal information; determine a transmission resource corresponding to the first information based on a correspondence between the first information and the transmission resource; and report the terminal information based on the transmission resource.

In the embodiment of the disclosure, the reporting module 102 is configured to: report the terminal information based on the second type of random access message in response to the first random access message being the second type of random access message.

In the embodiment of the disclosure, the first type of random access message is the Msg. 1 in a random access process, and the second type of random access message is the Msg. 3 in a random access process.

In the embodiment of the disclosure, the reporting module 102 is configured to: report the terminal information based on the first type of random access message or report the terminal information based on the second type of random access message depending on a predefined rule or pre-configuration information, in response to the first random access message including the first type of random access message and the second type of random access message.

In the embodiment of the disclosure, the pre-configuration information is carried by a system message.

In the embodiment of the disclosure, the apparatus further includes: an obtaining module 103.

The obtaining module 103 is configured to: obtain a first indication message, in which the first indication message is configured to indicate a random access message through which the terminal reports the terminal information; and determine the first random access message based on the first indication message.

In the embodiment of the disclosure, the obtaining module 103 is configured to: obtain the first indication message based on a preconfigured information field; or, obtain the first indication message based on a configuration of a PRACH.

In the embodiment of the disclosure, the transmission resource includes at least one of:

an initial BWP; a PRACH transmission time; a transmission frequency; or a preamble.

In the embodiment of the disclosure, the terminal capability includes at least one of:

a number of receiving antennas; a transmitting and receiving bandwidth; a duplex mode of the terminal; or a modulation mode supported by the terminal.

In the embodiment of the disclosure, the channel state information of the terminal includes at least one of:

a reference signal reception strength; or a signal-to-noise interference ratio.

Figure 31:
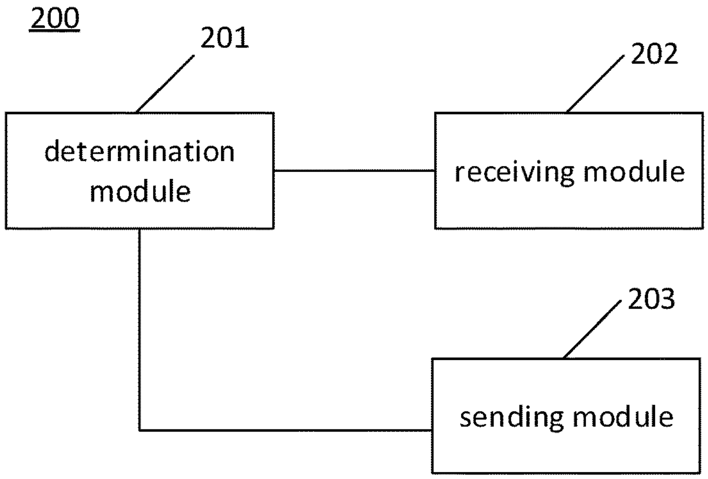
FIG. 31 is a block diagram illustrating another apparatus for reporting information applied to a network device according to an example embodiment.

FIG. 31 is a block diagram illustrating an apparatus 200 for reporting information according to an example embodiment. As illustrated in FIG. 31, the apparatus 200 is applied to a network device. The apparatus 200 includes: a determination module 201 and a receiving module 202.

The determination module 201 is configured to determine a first random access message from a plurality of random access messages supported by the network device. The receiving module 202 is configured to receive terminal information based on the first random access message. The terminal information includes terminal capability information and/or channel state information of a terminal.

In the embodiment of the disclosure, the plurality of random access messages at least include a first type of random access message and a second type of random access message.

In the embodiment of the disclosure, the determination module 201 is configured to: determine that the first random access message is the first type of random access message in response to the terminal having a first type of terminal capability or the terminal being a first type of terminal, and/or a channel state value of the terminal not reaching a first threshold value.

In the embodiment of the disclosure, the determination module 201 is configured to: determine that the first random access message is the second type of random access message in response to the terminal not having a first type of terminal capability or the terminal being a second type of terminal, and/or a channel state value of the terminal reaching a first threshold value.

In the embodiment of the disclosure, the receiving module 202 is configured to: determine first information in response to the first random access message being the first type of random access message, in which the first information includes at least one of the terminal capability, the terminal type or the channel state value of the terminal, and the first type of random access message includes a plurality of transmission resources for representing the terminal information; determine a transmission resource corresponding to the first information based on a correspondence between the first information and the transmission resource; and receive the terminal information based on the transmission resource.

In the embodiment of the disclosure, the receiving module 202 is configured to: receive the terminal information based on the second type of random access message in response to the first random access message being the second type of random access message.

In the embodiment of the disclosure, the first type of random access message is the Msg. 1 in a random access process, and the second type of random access message is the Msg. 3 in a random access process.

In the embodiment of the disclosure, the receiving module 202 is configured to: receive the terminal information based on the first type of random access message or receive the terminal information based on the second type of random access message depending on a predefined rule or pre-configuration information, in response to the first random access message including the first type of random access message and the second type of random access message.

In the embodiment of the disclosure, the pre-configuration information is carried by a system message.

In the embodiment of the disclosure, the apparatus for reporting information includes: a sending module 203.

The sending module 203 is configured to: send a first indication message. The first indication message is configured to indicate a random access message through which the terminal reports the terminal information.

In the embodiment of the disclosure, the sending module 203 is configured to: send the first indication message based on a preconfigured information field; or send the first indication message based on a PRACH.

In the embodiment of the disclosure, the transmission resource includes at least one of:

an initial BWP; a PRACH transmission time; a transmission frequency; or a preamble.

In the embodiment of the disclosure, the terminal capability includes at least one of:

a number of receiving antennas; a transmitting and receiving bandwidth; a duplex mode of the terminal; or a modulation mode supported by the terminal.

In the embodiment of the disclosure, the channel state information of the terminal includes at least one of:

a reference signal reception strength; or a signal-to-noise interference ratio.

Regarding the apparatuses in the above embodiments, the specific way in which each module performs its operation has been described in detail in the method embodiments, and will not be described in detail here.

Figure 32:
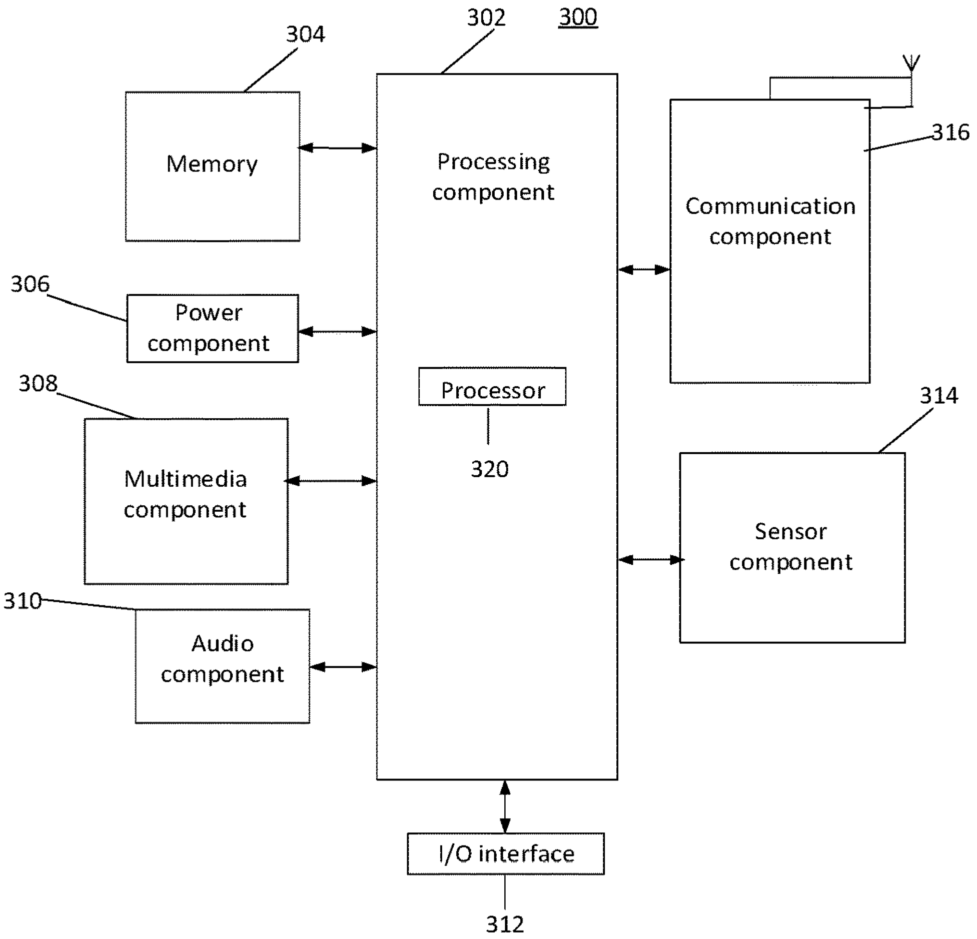
FIG. 32 is a block diagram illustrating a device for reporting information according to an example embodiment.

FIG. 32 is a block diagram illustrating a device 300 for reporting information according to an example embodiment. For example, the device 300 may be a mobile phone, a computer, a digital broadcasting terminal, a message transceiver device, a game console, a tablet device, a medical device, a fitness device and a PDA.

As illustrated in FIG. 32, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone call, data communication, camera operation, and recording operation. The processing component 302 may include one or more processors 320 to perform instructions to implement all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a calling mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In an exemplary embodiment, the communication component 316 receives a broadcast signal from an external broadcast management system or broadcast associated information via a broadcast channel. In an exemplary embodiment, the communication component 316 further includes a Near Field Communication (NFC) module to facilitate shortrange communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 304, executable by the processor 320 in the device 300, for implementing the above methods. For example, the non-transitory computer-readable storage medium may be a ROM, a Random Access Memory (RAM), a CD-ROM, a magnetic tape, a floppy disc, and an optical data storage device.

Figure 33:
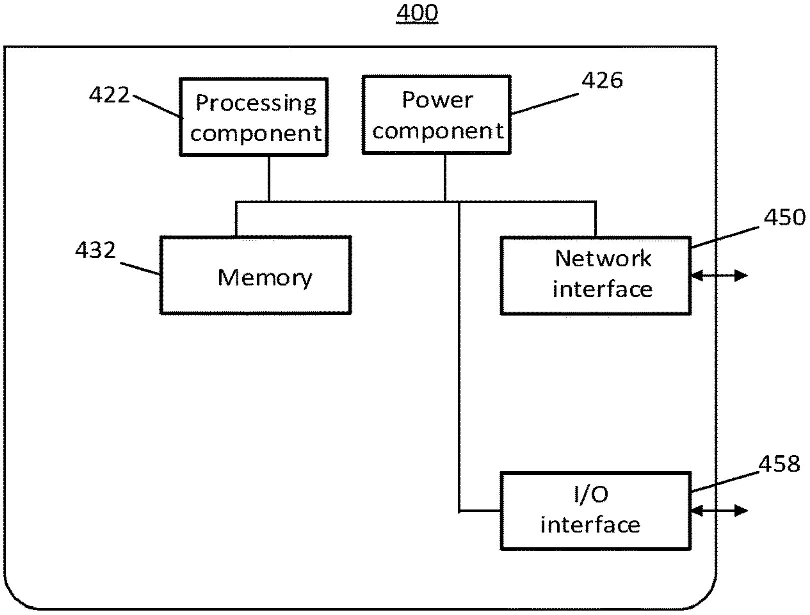
FIG. 33 is a block diagram illustrating another device for reporting information according to an example embodiment.

FIG. 33 is a block diagram illustrating another device 400 for reporting information according to an example embodiment. For example, the device 400 may be provided as a server. As illustrated in FIG. 33, the device 400 includes a processing component 422 including one or more processors, and memory resources represented by a memory 432 for storing instructions that can be executed by the processing component 422, such as applications. The application programs stored in the memory 432 may include one or more modules each corresponding to a set of instructions. In addition, the processing component 422 is configured to execute the instructions to perform the methods described above.

The device 400 may also include a power component 426 configured to perform power management of the device 400, a wired or wireless network interface 450 configured to connect the device 400 to a network, and an I/O interface 458. The device 400 may operate on an operating system stored in the memory 432, such as Windows Server™, Mac OS X™, Unix™, Linux™, FreeBSD™, or the like.

In some examples, a method for sending information, performed by a terminal, includes: determining a first random access message from a plurality of random access messages supported by the terminal; and sending terminal information based on the first random access message, in which the terminal information includes at least one of terminal capability information or channel state information of the terminal.

In an implementation, the plurality of random access messages at least include a first type of random access message and a second type of random access message.

In an implementation, determining the first random access message from the plurality of random access messages supported by the terminal includes: determining that the first random access message is the first type of random access message, in response to the terminal having a first type of terminal capability or the terminal being a first type of terminal, and/or a channel state value of the terminal not reaching a first threshold value or the channel state value of the terminal reaching the first threshold value.

In an implementation, determining the first random access message from the plurality of random access messages supported by the terminal includes: determining that the first random access message is the second type of random access message, in response to the terminal not having a first type of terminal capability or the terminal being a second type of terminal, and/or a channel state value of the terminal reaching a first threshold value or the channel state value of the terminal not reaching the first threshold value.

In an implementation, sending the terminal information based on the first random access message includes: determining first information in response to the first random access message being the first type of random access message, in which the first information includes at least one of a terminal capability, a terminal type or a channel state value of the terminal, and the first type of random access message includes a plurality of transmission resources for representing the terminal information; determining a transmission resource corresponding to the first information based on a correspondence between the first information and the transmission resource; and sending the terminal information based on the transmission resource.

In an implementation, sending the terminal information based on the first random access message includes: sending the terminal information based on the second type of random access message in response to the first random access message being the second type of random access message.

In an implementation, the first type of random access message is Msg. 1 in a random access process, and the second type of random access message is Msg. 3 in a random access process.

In an implementation, sending the terminal information based on the first random access message includes: sending the terminal information based on a first type of random access message or sending the terminal information based on the second type of random access message depending on a predefined rule or pre-configuration information, in response to the first random access message comprising the first type of random access message and the second type of random access message.

In an implementation, the pre-configuration information is carried by a system message.

In an implementation, determining the first random access message from the plurality of random access messages supported by the terminal includes: obtaining a first indication message, in which the first indication message is configured to indicate a random access message through which the terminal sends the terminal information; and determining the first random access message based on the first indication message.

In an implementation, obtaining the first indication message includes: obtaining the first indication message based on a preconfigured information field; or, obtaining the first indication message based on a configuration of a Physical Random Access Channel (PRACH).

In an implementation, the transmission resource includes at least one of: an initial bandwidth part (BWP); a Physical Random Access Channel (PRACH) transmission time; a transmission frequency; or a preamble.

In an implementation, the terminal capability includes at least one of: a number of receiving antennas; a transmitting and receiving bandwidth; a duplex mode of the terminal; or a modulation mode supported by the terminal.

In an implementation, the channel state information of the terminal includes at least one of: a reference signal reception strength; or a signal-to-noise interference ratio.

In some examples, a method for receiving information, performed by a network device, includes: determining a first random access message from a plurality of random access messages supported by the network device; and receiving terminal information based on the first random access message, in which the terminal information includes at least one of terminal capability information or channel state information of a terminal.

In an implementation, the plurality of random access messages at least include a first type of random access message and a second type of random access message.

In an implementation, determining the first random access message from the plurality of random access messages supported by the network device includes: determining that the first random access message is a first type of random access message in response to the terminal having a first type of terminal capability or the terminal being a first type of terminal, and/or a channel state value of the terminal not reaching a first threshold value.

In an implementation, determining the first random access message from the plurality of random access messages supported by the network device includes: determining that the first random access message is a second type of random access message, in response to the terminal not having a first type of terminal capability or the terminal being a second type of terminal, and/or a channel state value of the terminal reaching a first threshold value.

In an implementation, receiving the terminal information based on the first random access message includes: determining first information in response to the first random access message being the first type of random access message, in which the first information includes at least one of a terminal capability, a terminal type and a channel state value of the terminal, and the first type of random access message includes a plurality of transmission resources for representing the terminal information; determining a transmission resource corresponding to the first information based on a correspondence between the first information and the transmission resource; and receiving the terminal information based on the transmission resource.

In an implementation, receiving the terminal information based on the first random access message includes: receiving the terminal information based on the second type of random access message in response to the first random access message being the second type of random access message.

In an implementation, the first type of random access message is Msg. 1 in a random access process, and the second type of random access message is Msg. 3 in a random access process.

In an implementation, receiving the terminal information based on the first random access message includes: receiving the terminal information based on a first type of random access message or receiving the terminal information based on a second type of random access message depending on a predefined rule or pre-configuration information, in response to the first random access message including the first type of random access message and the second type of random access message.

In an implementation, the pre-configuration information is carried by a system message.

In an implementation, determining the first random access message from the plurality of random access messages supported by the network device includes: sending a first indication message, in which the first indication message is configured to indicate a random access message through which the terminal sends the terminal information; and determining the first random access message based on the first indication message.

In an implementation, sending the first indication message includes: sending the first indication message based on a preconfigured information field; or, sending the first indication message based on a Physical Random Access Channel (PRACH).

In an implementation, the transmission resource includes at least one of: an initial bandwidth part (BWP); a Physical Random Access Channel (PRACH) transmission time; a transmission frequency; or a preamble.

In an implementation, the terminal capability includes at least one of: a number of receiving antennas; a transmitting and receiving bandwidth; a duplex mode of the terminal; or a modulation mode supported by the terminal.

In an implementation, the channel state information of the terminal includes at least one of: a reference signal reception strength; or a signal-to-noise interference ratio.

In some examples, an apparatus for sending information, applied to a terminal, includes: a determining module, configured to determine a first random access message from a plurality of random access messages supported by the terminal; and a reporting module, configured to send terminal information based on the first random access message, in which the terminal information includes at least one of terminal capability information or channel state information of the terminal.

In an implementation, the plurality of random access messages at least include a first type of random access message and a second type of random access message.

In an implementation, the determining module is configured to: determine that the first random access message is the first type of random access message, in response to the terminal having a first type of terminal capability or the terminal being a first type of terminal, and/or a channel state value of the terminal not reaching a first threshold value or the channel state value of the terminal reaching the first threshold value.

In an implementation, the determining module is configured to: determine that the first random access message is the second type of random access message, in response to the terminal not having a first type of terminal capability or the terminal being a second type of terminal, and/or a channel state value of the terminal reaching a first threshold value or the channel state value of the terminal not reaching the first threshold value.

In an implementation, the reporting module is configured to: determine first information in response to the first random access message being the first type of random access message, in which the first information includes at least one of a terminal capability, a terminal type or a channel state value of the terminal, and the first type of random access message includes a plurality of transmission resources for representing the terminal information; determine a transmission resource corresponding to the first information based on a correspondence between the first information and the transmission resource; and send the terminal information based on the transmission resource.

In an implementation, the reporting module is configured to: send the terminal information based on the second type of random access message in response to the first random access message being the second type of random access message.

In an implementation, the first type of random access message is Msg. 1 in a random access process, and the second type of random access message is Msg. 3 in a random access process.

In an implementation, the reporting module is configured to: send the terminal information based on a first type of random access message or send the terminal information based on a second type of random access message depending on a predefined rule or pre-configuration information, in response to the first random access message including the first type of random access message and the second type of random access message.

In an implementation, the pre-configuration information is carried by a system message.

In an implementation, the apparatus for sending information further includes: an obtaining module.

The obtaining module is configured to: obtain a first indication message, in which the first indication message is configured to indicate a random access message through which the terminal sends the terminal information; and determine the first random access message based on the first indication message.

In an implementation, the obtaining module is configured to: obtain the first indication message based on a preconfigured information field; or, obtain the first indication message based on configuration of a Physical Random Access Channel (PRACH).

In an implementation, the transmission resource includes at least one of: an initial bandwidth part (BWP); a Physical Random Access Channel (PRACH) transmission time; a transmission frequency; or a preamble.

In an implementation, the terminal capability includes at least one of: a number of receiving antennas; a transmitting and receiving bandwidth; a duplex mode of the terminal; or a modulation mode supported by the terminal.

In an implementation, the channel state information of the terminal includes at least one of: a reference signal reception strength; or a signal-to-noise interference ratio.

In some examples, an apparatus for receiving information, applied to a network device, includes: a determination module, configured to determine a first random access message from a plurality of random access messages supported by the network device; and a receiving module, configured to receive terminal information based on the first random access message, in which the terminal information includes at least one of terminal capability information or channel state information of a terminal.

In an implementation, the plurality of random access messages at least include a first type of random access message and a second type of random access message.

In an implementation, the determination module is configured to: determine that the first random access message is the first type of random access message in response to the terminal having a first type of terminal capability or the terminal being a first type of terminal, and/or a channel state value of the terminal not reaching a first threshold value.

In an implementation, the determination module is configured to: determine that the first random access message is the second type of random access message, in response to the terminal not having a first type of terminal capability or the terminal being the second type of terminal, and/or a channel state value of the terminal reaching a first threshold value.

In an implementation, the receiving module is configured to: determine first information in response to the first random access message being the first type of random access message, in which the first information includes at least one of a terminal capability, a terminal type or a channel state value of the terminal, and the first type of random access message includes a plurality of transmission resources for representing the terminal information; determine a transmission resource corresponding to the first information based on a correspondence between the first information and the transmission resource; and receive the terminal information based on the transmission resource.

In an implementation, the receiving module is configured to: receive the terminal information based on the second type of random access message in response to the first random access message being the second type of random access message.

In an implementation, the first type of random access message is Msg. 1 in a random access process, and the second type of random access message is Msg. 3 in a random access process.

In an implementation, the receiving module is configured to: receive the terminal information based on a first type of random access message or receive the terminal information based on a second type of random access message depending on a predefined rule or pre-configuration information, in response to the first random access message including the first type of random access message and the second type of random access message.

In an implementation, the pre-configuration information is carried by a system message.

In an implementation, the apparatus for receiving information includes: a sending module.

The sending module is configured to: send a first indication message, in which the first indication message is configured to indicate a random access message through which the terminal sends the terminal information.

In an implementation, the sending module is configured to: send the first indication message based on a preconfigured information field; or, send the first indication message based on a Physical Random Access Channel (PRACH).

In an implementation, the transmission resource includes at least one of: an initial bandwidth part (BWP); a Physical Random Access Channel (PRACH) transmission time; a transmission frequency; or a preamble.

In an implementation, the terminal capability includes at least one of: a number of receiving antennas; a transmitting and receiving bandwidth; a duplex mode of the terminal; or a modulation mode supported by the terminal.

In an implementation, the channel state information of the terminal includes at least one of: a reference signal reception strength; or a signal-to-noise interference ratio.

In some examples, a device for sending information is provided. The device includes: a processor and a memory for storing instructions executable by the processor, in which the processor is configured to perform the methods for sending information as described above.

In some examples, a device for receiving information is provided. The device includes: a processor and a memory for storing instructions executable by the processor, in which the processor is configured to perform the methods for receiving information as described above.

In some examples, a non-transitory computer-readable storage medium having instructions stored thereon is provided. When the instructions are executed by a processor of a mobile terminal, the mobile terminal is caused to perform the methods as described above.

The technical solutions according to embodiments of the disclosure may include the following beneficial effects. By determining the random access messages supported by the network device and the terminal to send the terminal capabilities, the network can perform a configuration according to the state of the network or the terminal can make a selection according to the preconfigured or predefined rule and based on the terminal side information, which not only inform the network of the terminal capability in a timely manner, but also avoids the waste of resources.

It is further understandable that the term "multiple" in the disclosure refers to two or more, which is the similar for other quantifiers. The term “and/or” describes a relation of associated objects, which indicates three relations, for example, “A and/or B” indicates that A exists alone, A and B both exist, and B exists alone. The character “/” generally indicates that the associated objects prior to and after the character “/” is an “or” relation. The terms “a”, “said” and “the” in the singular form are also intended to include the plural form, unless the context clearly indicates otherwise.

It is further understood that the terms “first”, “second”, etc. are used to describe various types of information, but that such information should not be limited to these terms. These terms are used only to distinguish information of the same type from each another and do not indicate a particular order or degree of importance. In fact, the expressions “first” and “second” can be used interchangeably. For example, without departing from the scope of this disclosure, first information may also be referred to as second information, and similarly, second information may also be referred to as first information.

It is further understandable that although the operations are depicted in the accompanying drawings in a particular order in the embodiments of the disclosure, this should not be construed as requiring that the operations be performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sending information, performed by a terminal, comprising:

determining a first random access message from a plurality of random access messages supported by the terminal in response to at least one of: the terminal having a first type of terminal capability, or the terminal being a first type of terminal, wherein the first access message comprises a Msg.1 message and a Msg.3 message in a random access process; and for a single terminal information report, sending same terminal information respectively via the Msg.1 message and the Msg.3 message, wherein the terminal information comprises at least one of terminal capability information or channel state information of the terminal.

2. The method of claim 1, wherein the plurality of random access messages at least comprise the Msg.1 and Msg.3 messages.

3. The method of claim 1, wherein sending the same terminal information respectively via the Msg.1 message and Msg.3 message comprises:

determining first information in response to the first random access message comprising the Msg.1 message, wherein the first information comprises at least one of a terminal capability, a terminal type or a channel state value of the terminal, and the Msg.1 message comprises a plurality of transmission resources for representing the terminal information;

determining a transmission resource corresponding to the first information based on a correspondence between the first information and the transmission resource; and sending the terminal information based on the transmission resource.

4. The method of claim 3, wherein the transmission resource comprises at least one of:

an initial bandwidth part (BWP);

a Physical Random Access Channel (PRACH) transmission time;

a transmission frequency; or a preamble.

5. The method of claim 1, wherein sending the same terminal information respectively via the Msg.1 message and Msg.3 message comprises:

sending the terminal information based on the Msg.3 message in response to the first random access message comprising the Msg.3 message.

6. The method of claim 1, wherein determining the first random access message from the plurality of random access messages supported by the terminal comprises:

obtaining a first indication message, wherein the first indication message is configured to indicate that the same terminal information is sent respectively via the Msg.1 message and Msg.3 message; and determining the first random access message based on the first indication message;

wherein obtaining the first indication message comprises: obtaining the first indication message based on a preconfigured information field; or obtaining the first indication message based on a configuration of a Physical Random Access Channel (PRACH).

7. The method of claim 1, wherein the terminal capability information comprises at least one of:

a number of receiving antennas;

a transmitting and receiving bandwidth;

a duplex mode of the terminal; or a modulation mode supported by the terminal;

wherein the channel state information of the terminal comprises at least one of:

a reference signal reception strength; or a signal-to-noise interference ratio.

8. A method for receiving information, performed by a network device, comprising:

determining a first random access message from a plurality of random access messages supported by the network device in response to at least one of: a terminal having a first type of terminal capability, or a terminal being a first type of terminal, wherein the first access message comprises a Msg.1 message and a Msg.3 message in a random access process; and for a single terminal information report, receiving same terminal information respectively via the Msg.1 message and the Msg.3 message from the terminal, wherein the terminal information comprises at least one of terminal capability information or channel state information of the terminal.

9. The method of claim 8, wherein the plurality of random access messages at least comprise the Msg.1 and Msg.3 messages.

10. The method of claim 8, wherein first information is determined in response to the first random access message comprising the Msg.1 message, wherein the first information comprises at least one of a terminal capability, a terminal type or a channel state value of the terminal, and the Msg.1 message comprises a plurality of transmission resources for representing the terminal information;

determining a transmission resource corresponding to the first information based on a correspondence between the first information and the transmission resource; and receiving the terminal information based on the transmission resource.

11. The method of claim 10, wherein the transmission resource comprises at least one of:

an initial bandwidth part (BWP);

a Physical Random Access Channel (PRACH) transmission time;

a transmission frequency; or a preamble.

12. The method of claim 8, wherein receiving the same terminal information respectively via the Msg.1 message and Msg.3 message comprises:

receiving the terminal information based on the Msg.3 message in response to the first random access message comprising the Msg.3 message.

13. The method of claim 8, wherein determining the first random access message from the plurality of random access messages supported by the network device comprises:

sending a first indication message, wherein the first indication message is configured to indicate that the same terminal information is report respectively via the Msg.1 message and Msg.3 message from the terminal;

wherein sending the first indication message comprises:

sending the first indication message based on a preconfigured information field; or sending the first indication message based on a Physical Random Access Channel PRACH).

14. The method of claim 8, wherein the terminal capability information comprises at least one of:

a number of receiving antennas;

a transmitting and receiving bandwidth;

a duplex mode of the terminal; or a modulation mode supported by the terminal;

wherein the channel state information of the terminal comprises at least one of:

a reference signal reception strength; or a signal-to-noise interference ratio.

15. A device for receiving information, comprising:

a processor; and a memory for storing instructions executable by the processor;

wherein the processor is configured to perform the method of claim 8.

16. A terminal for reporting information, comprising:

a processor; and a memory for storing instructions executable by the processor;

wherein the processor is configured to:

determine a first random access message from a plurality of random access messages supported by the terminal in response to at least one of: the terminal having a first type of terminal capability, or the terminal being a first type of terminal, wherein the first access message comprises a Msg.1 message and a Msg.3 message in a random access process; and for a single terminal information report, send same terminal information respectively via the Msg.1 message and the Msg.3 message, wherein the terminal information comprises at least one of terminal capability information or channel state information of the terminal.

* * * * *